(12) United States Patent
Nakao et al.

(10) Patent No.: US 11,766,937 B2
(45) Date of Patent: Sep. 26, 2023

(54) DISPLAY CONTROL METHOD AND DISPLAY CONTROL DEVICE

(71) Applicant: Nissan Motor Co., Ltd., Yokohama (JP)

(72) Inventors: Hikaru Nakao, Kanagawa (JP); Akira Morimoto, Kanagawa (JP); Kosuke Sato, Kanagawa (JP); Shohei Nakamura, Kanagawa (JP); Shuko Ishimaru, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/608,704

(22) PCT Filed: May 15, 2019

(86) PCT No.: PCT/JP2019/019410
§ 371 (c)(1),
(2) Date: Nov. 3, 2021

(87) PCT Pub. No.: WO2020/230313
PCT Pub. Date: Nov. 19, 2020

(65) Prior Publication Data
US 2022/0203834 A1 Jun. 30, 2022

(51) Int. Cl.
*G06F 3/14* (2006.01)
*G06T 19/00* (2011.01)
(Continued)

(52) U.S. Cl.
CPC .......... *B60K 35/00* (2013.01); *G02B 27/0101* (2013.01); *G06F 3/1423* (2013.01);
(Continued)

(58) Field of Classification Search
CPC ............ G06F 3/1423; B60K 2370/184; B60K 2370/52; B60W 30/18163; G02B 2027/0141
See application file for complete search history.

(56) References Cited

U.S. PATENT DOCUMENTS

2015/0015962 A1* 1/2015 Takasu .................. G02B 27/01
359/630
2016/0125631 A1 5/2016 Ham
(Continued)

FOREIGN PATENT DOCUMENTS

CN 106062613 A 10/2016
CN 108973857 A 12/2018
(Continued)

*Primary Examiner* — Grace Q Li
(74) *Attorney, Agent, or Firm* — Young Basile Hanlon & MacFarlane, P.C.

(57) ABSTRACT

In a display control method, a first information image is displayed on a head-up display. The first information image includes a first vehicle icon which is a figure indicating a vehicle, and a first character string arranged above the first vehicle icon. A second information image is displayed on a meter display. The second information image includes a second vehicle icon which is a figure indicating a vehicle, and a second character string which is arranged below the second vehicle icon, and includes the first character string.

11 Claims, 17 Drawing Sheets

(51) Int. Cl.
  *B60K 35/00*    (2006.01)
  *G02B 27/01*    (2006.01)
  *B60W 30/18*    (2012.01)

(52) U.S. Cl.
  CPC ...... *G06T 19/006* (2013.01); *B60K 2370/157* (2019.05); *B60K 2370/1529* (2019.05); *B60K 2370/161* (2019.05); *B60K 2370/171* (2019.05); *B60K 2370/184* (2019.05); *B60K 2370/52* (2019.05); *B60W 30/18163* (2013.01); *G02B 2027/0141* (2013.01)

(56) References Cited

U.S. PATENT DOCUMENTS

| | | | |
|---|---|---|---|
| 2016/0339959 A1* | 11/2016 | Lee | B60W 30/09 |
| 2017/0361853 A1* | 12/2017 | Nagy | B60W 10/20 |
| 2018/0272944 A1* | 9/2018 | Goncalves | B60R 1/00 |
| 2018/0345790 A1 | 12/2018 | Mimura et al. | |
| 2019/0072957 A1* | 3/2019 | Fujimura | G05D 1/0061 |
| 2019/0146495 A1* | 5/2019 | Yan | B60W 40/08 701/26 |
| 2019/0283770 A1* | 9/2019 | Kubota | B60W 30/18163 |
| 2020/0164797 A1* | 5/2020 | Akachi | G08B 3/10 |
| 2020/0317219 A1* | 10/2020 | Yoshida | B62D 15/0255 |
| 2021/0394677 A1* | 12/2021 | Katagiri | B60W 50/14 |

FOREIGN PATENT DOCUMENTS

| | | |
|---|---|---|
| JP | 2010-221730 A | 10/2010 |
| JP | 2015-169431 A | 9/2015 |
| JP | 2017-128306 A | 7/2017 |
| JP | 2018-197691 A | 12/2018 |

\* cited by examiner

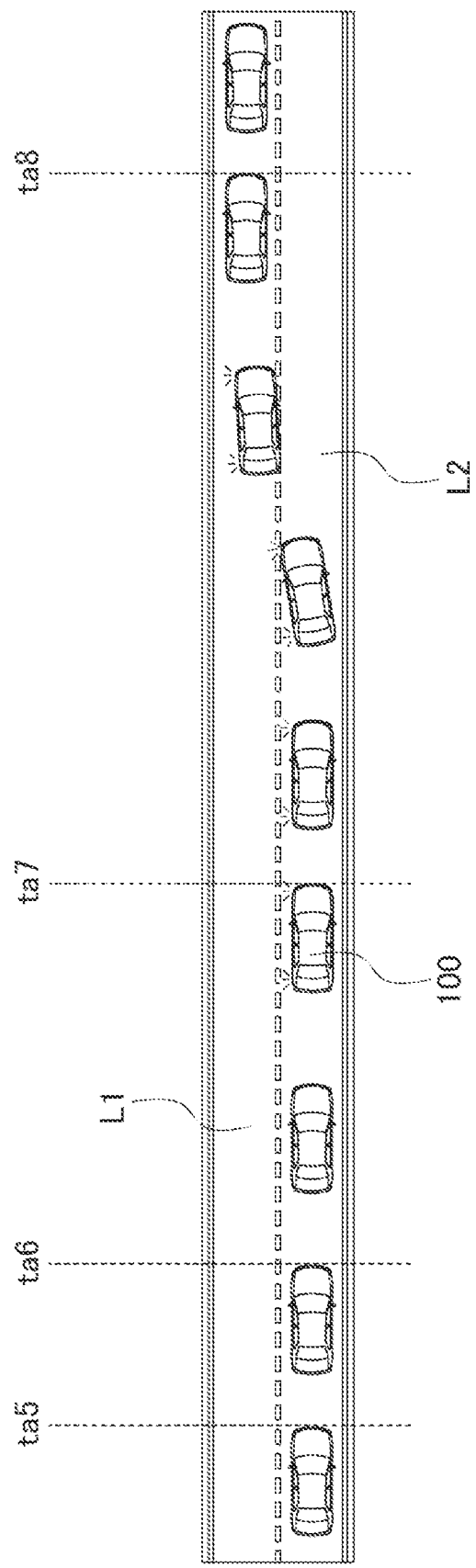

DISPLAY CONTROL METHOD AND DISPLAY CONTROL DEVICE

TECHNICAL FIELD

The present invention relates to a display control method and a display control device.

BACKGROUND

Conventionally, a technique is known by which information is displayed to a driver of a host-vehicle by using a head-up display and a meter display (for example, Japanese Unexamined Patent Application Publication No. 2010-221730). Japanese Unexamined Patent Application Publication No. 2010-221730 discloses contents in which when an image is displayed on the head-up display, the same image as the head-up display is displayed on the meter display.

SUMMARY

A display position of an image on a head-up display, and a display position of an image on a meter display are different. Therefore, visibility characteristics of a driver relative to the images are different between the head-up display and the meter display. If the same image is displayed on each of the head-up display and the meter display, as in the technique described in Japanese Unexamined Patent Application Publication No. 2010-221730, the driver may not be able to recognize necessary information.

The present invention is made in view of the above problem, and an object of the present invention to provide a display control method and a display control device which enable a driver to appropriately grasp information from a head-up display and a meter display.

In a display control method according to one aspect of the present invention, a first image is displayed on a head-up display. The first image includes a first vehicle icon that is a figure indicating a vehicle, and a first character string arranged above the first vehicle icon. Further, in the display control method, a second image is displayed on a meter display. The second image includes a second vehicle icon which is a figure indicating a vehicle, and a second character string that is arranged below the second vehicle icon, and includes the first character string.

According to the present invention, a driver can properly grasp information from a head-up display and a meter display.

BRIEF DESCRIPTION OF THE DRAWINGS

FIG. 4B is an explanatory diagram for showing a series of movements from a second lane to a first lane of a host-vehicle in a situation of overtaking a preceding vehicle by the automatic lane change proposed by a system;

DETAILED DESCRIPTION

Figure 1:
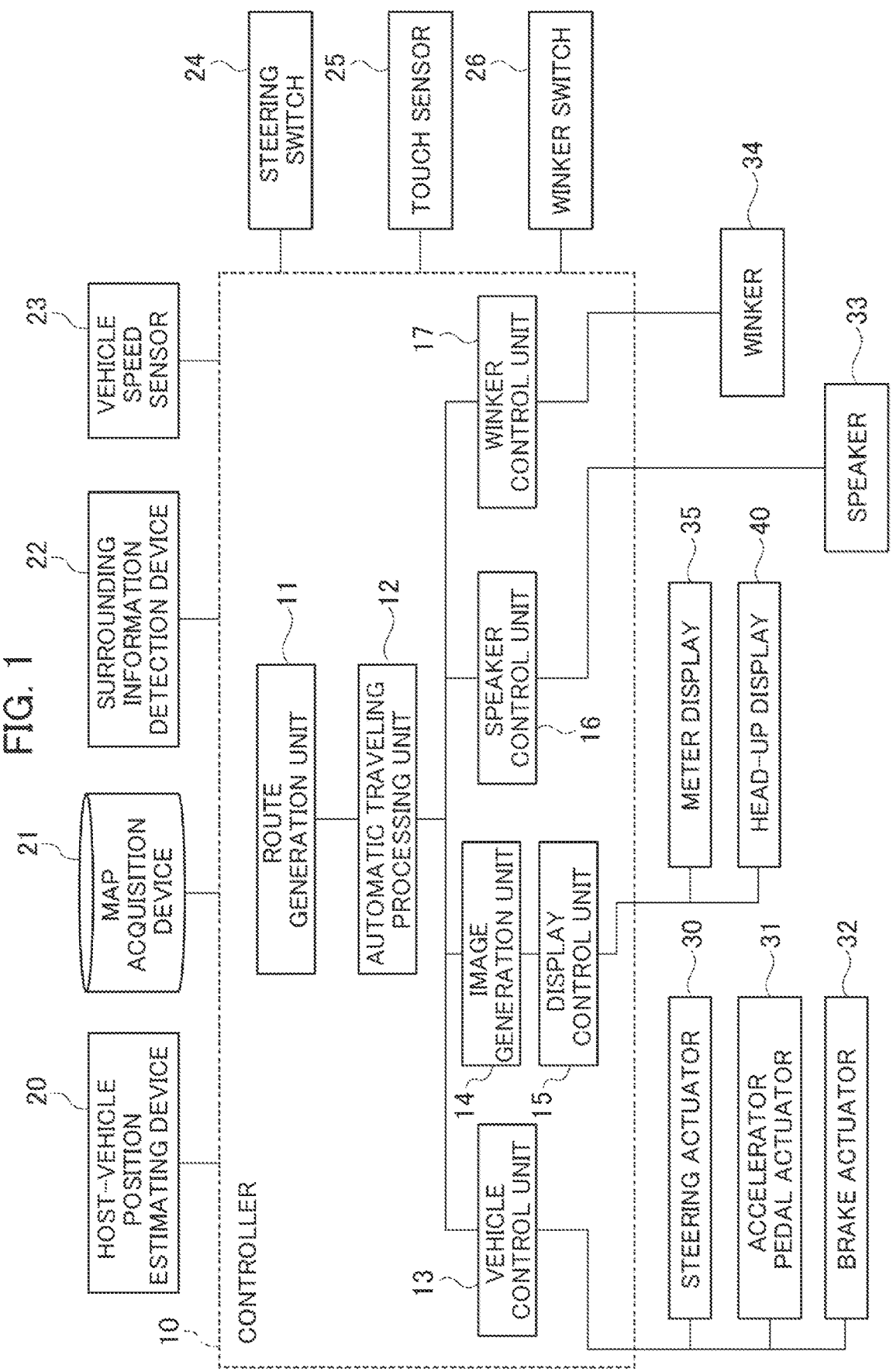
FIG. 1 is a block diagram showing a control system applied with a display control device according to the present embodiment.

An embodiment of the present invention will be described below with reference to the drawings. In the drawings, the same parts are denoted with the same reference numerals, and description thereof is omitted.

Descriptions will be given by applying a display control device and a display control method according to the present embodiment to a control system (a vehicle control system) that controls the behavior of a host-vehicle, and performs automatic driving. The automatic driving means, for example, a state in which at least one of actuators, such as a brake, an accelerator, and a steering is controlled without an operation by an occupant. Therefore, other actuators may be actuated through the operation by the occupant. Further, the automatic driving may be a state in which any control such as acceleration/deceleration control and lateral position control is performed. In the present embodiment, manual driving means, for example, a state in which an occupant operates the brake, accelerator, and steering. The host-vehicle may be capable of switching between the automatic driving and the manual driving.

An example of the automatic driving is the automatic lane change. The automatic lane change means that the control system controls the behavior of the host-vehicle, so that the host-vehicle changes a lane from a host-vehicle lane on which the host-vehicle travels, to one of the right and left adjacent lanes adjacent to the host-vehicle lane.

Figure 2:
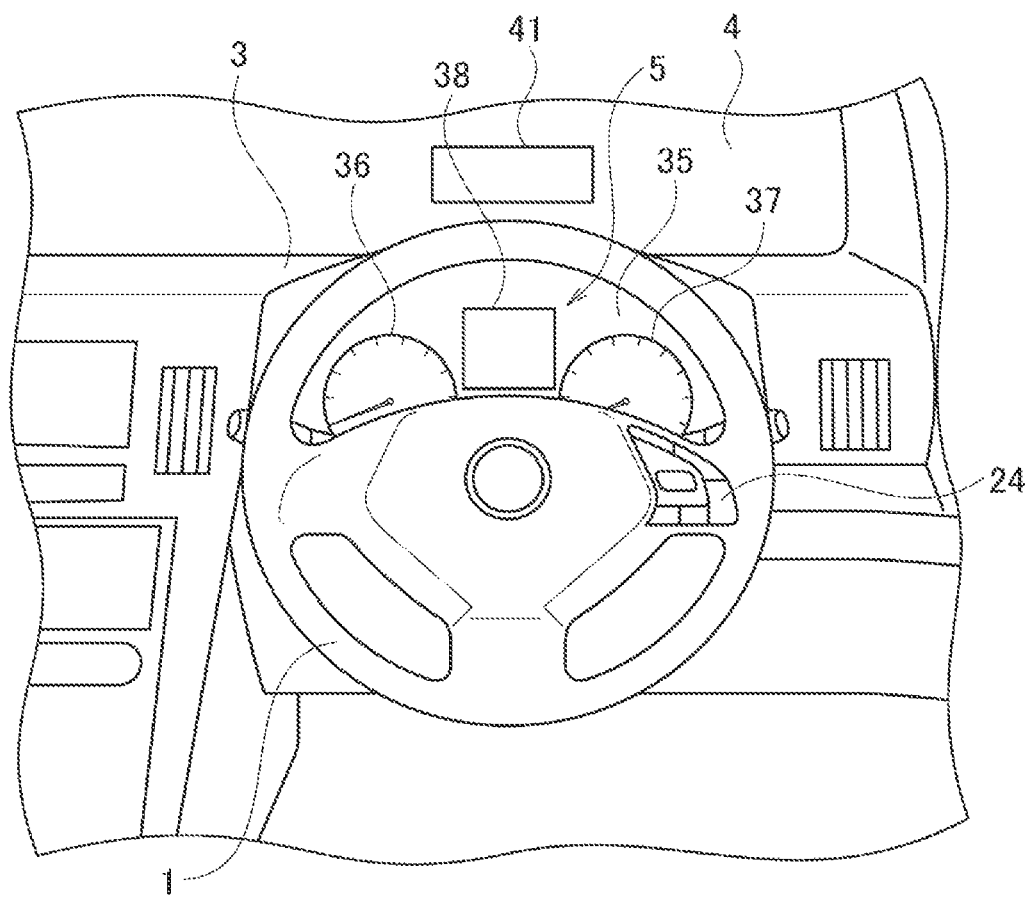
FIG. 2 is an explanatory diagram schematically showing a scene ahead of a driver's seat of a host-vehicle.

A configuration of the control system will be described with reference to FIGS. 1 and 2. The control system includes a controller 10, a host-vehicle position estimating device 20, a map acquisition device 21, a surrounding information detection device 22, a vehicle speed sensor 23, a steering switch 24, a touch sensor 25, and a winker switch 26. Further, the control system includes a steering actuator 30, an accelerator pedal actuator 31, and a brake actuator 32. Still further, the control system includes a meter display 35 and a head-up display 40.

In the interior of the host-vehicle applied with the control system, a steering 1 is arranged ahead of a driver, and an instrument panel 3 is arranged ahead of the steering 1. The instrument panel 3 is provided with a meter unit 5 for displaying, to the driver, a meter of the host-vehicle. A windshield 4 is arranged ahead of the instrument panel 3.

The controller 10 is a general-purpose microcomputer including a CPU (a central processing unit), a memory, and, an input/output unit. The microcomputer is installed with a computer program (a display control program, and a control program) for causing the microcomputer to function as a display control device, and the control system. By executing the computer program, the microcomputer functions as a plurality of information processing circuits in the control system. The present embodiment shows an example in which the software implements the plurality of information processing circuits in the control system. However, it is also possible to configure the information processing circuits by preparing dedicated hardware for executing each information process described later. Further, the plurality of information processing circuits may be constituted by individual hardware. Details of the plurality of information processing circuits of the controller 10 will be described later.

The host-vehicle position estimating device 20 measures an absolute position of the host-vehicle by using position estimation techniques, such as GPS (global positioning system) and odometry. The host-vehicle position estimating device 20 uses a position detection sensor to measure an absolute position of the host-vehicle, that is, a position of the host-vehicle relative to a predetermined reference point, a vehicle speed, an acceleration, a steering angle, and an attitude. The host-vehicle position estimating device 20 includes sensor for acquiring the behavior of the host-vehicle, such as a GPS receiver, inertial navigation equipment, sensors provided to a brake pedal, and an accelerator pedal, a wheel speed sensor and a yaw rate sensor, a laser radar, a camera, and the like. The host-vehicle position estimating device 20 outputs the measured position information of the host-vehicle to the controller 10.

The map acquisition device 21 acquires map information showing a structure of a road on which the host-vehicle travels. The map information acquired by the map acquisition device 21 includes information on a road structure such as an absolute position on each lane, the relationship on how lanes are connected, and the relationship on relative positions, traffic rules, road signs, and the like. The map acquisition device 21 may have a map database storing the map information, or alternatively may acquire the map information from an external map data server by using cloud computing. Further, the map acquisition device 21 may acquire the map information by using vehicle-to-vehicle communication, or vehicle-to-road communication. The map acquisition device 21 outputs the acquired map information to the controller 10.

The surrounding information detection device 22 includes a plurality of different kinds of object detection sensors mounted on the host-vehicle. The object detection sensors are, for example, a laser range finder, a laser radar, a millimeter wave radar, a camera or the like. The surrounding information detection device 22 detects objects around the host-vehicle by using the object detection sensors. The surrounding information detection device 22 detects moving objects including other vehicles, motorcycles, bicycles, and pedestrians, and stationary objects including parked vehicles. For example, the surrounding information detection device 22 detects positions, attitudes (yaw angles), sizes, speeds, accelerations, jerks, decelerations, and yaw rates of the moving object and the stationary object relative to the host-vehicle. The surrounding information detection device 22 may acquire surrounding information by using the vehicle-to-vehicle communication, or vehicle-to-road communication. The surrounding information detection device 22 outputs the detected information to the controller 10.

The vehicle speed sensor 23 detects a vehicle speed of the host-vehicle. The vehicle speed sensor 23 outputs, to the controller 10, the detected vehicle speed of the host-vehicle.

The steering switch 24 outputs an operation signal according to an operation by the driver. The steering switch 24 is provided to the steering 1. The steering switch 24 outputs, to the controller 10, the operation signal according to the operation by the driver.

The touch sensor 25 is provided to the steering 1, and detects that a driver's hand touches the steering 1. As the touch sensor 25, a capacitance type sensor for detecting a change in the capacitance can be used. If the driver's hand touches the steering 1, the touch sensor 25 outputs a predetermined detection signal to the controller 10.

The winker switch 26 is a switch which outputs an actuation signal for actuating a winker (a direction indicator) 34, and is operated by the driver. After being operated by the driver, the winker switch 26 outputs the actuation signal of the winker 34 to the controller 10.

The steering actuator 30 controls a steering angle of the steering 1. The steering actuator 30 is controlled by the controller 10.

The accelerator pedal actuator 31 controls the stepping amount of an accelerator pedal. The accelerator pedal actuator 31 is controlled by the controller 10.

The brake actuator 32 adjusts the stepping amount of the brake pedal. The brake actuator 32 is controlled by the controller 10.

The meter display 35 is arranged to the meter unit 5. The meter display 35 displays a predetermined image such that the driver can visually recognize the image. The driver can recognize various pieces of information from the image displayed on the meter display 35. The meter display 35 is formed of, for example, a liquid crystal panel. The image displayed on the meter display 35 is controlled by the controller 10.

The meter display 35 displays an image showing the meter of the host-vehicle. The image showing the meter includes a tachometer image 36 showing the tachometer, and a speedometer image 37 showing the speedometer. A left area of the entire area of the meter display 35 displays the tachometer image 36, and a right area of the entire area displays the speedometer image 37.

The meter display 35 displays a second information image 38 showing information notified to the driver by the control system. The second information image 38 is displayed in a central area of the entire area of the meter display 35. That is, the second information image 38 is displayed at a space between the tachometer image 36, and the speedometer image 37.

The tachometer and the speedometer may be formed of analog meters, and the meter display 35 may display only the second information image 38.

The head-up display 40 is arranged in the instrument panel 3. The head-up display 40 displays the predetermined image such that the driver can visually recognize the image by a remote display using a virtual image. The display light emitted from the head-up display 40 is projected on the windshield 4 through an opening (not shown) provided in the instrument panel 3. The display light is reflected by the windshield 4 to reach the eyepoint of the driver. This causes the driver to visually recognize the virtual image at the outside of the windshield 4. In this way, the head-up display 40 emits the image toward the windshield 4, and displays a virtual image obtained by the emitted image, such that the virtual image is superimposed on the scene ahead of the host-vehicle The head-up display 40 displays a first information image 41 showing information notified to the driver by the control system. The driver can simultaneously visually recognize the first information image 41 displayed by the head-up display 40, and the scene ahead of the host-vehicle viewable through the windshield 4.

Figure 3:
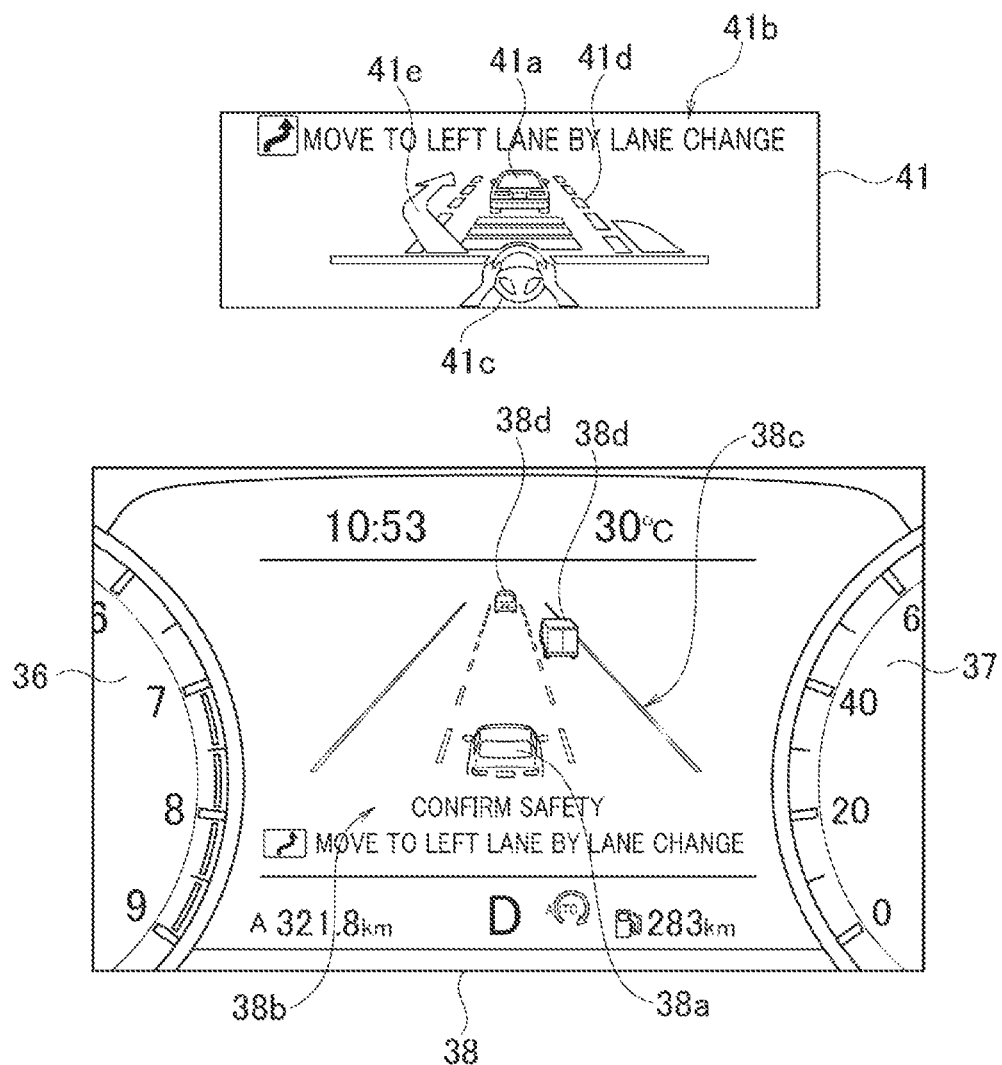
FIG. 3 is an explanatory diagram for explaining a first information image and a second information image.

Referring to FIG. 3, the first information image 41 displayed on the head-up display 40, and the second information image 38 displayed on the meter display 35 will be described.

The first information image 41 is mainly composed of a preceding vehicle icon 41a, a first character string 41b, a mode display icon 41c, a first lane marker icon 41d, and an arrow icon 41e.

The preceding vehicle icon 41a is a figure showing a preceding vehicle traveling on the same lane as the host-vehicle.

The first character string 41b includes one or more characters such as hiragana characters, Chinese characters, numbers, and symbols, and is, for example, a sentence. Further, the first character string 41b may include emoji (a pictogram) that plays the same role as the character.

The first character string 41b indicates the contents notified to the driver by the control system. The contents of the first character string 41b may be the contents of a request from the control system, for example, an operation instruction to the driver to perform the automatic lane change or the like. Alternatively, the contents of the first character string 41b may be the control contents of what the control system desires to perform, for example, the automatic lane change to be performed. That is, the control system uses the first character string 41b to notify the driver of the request from the control system, or what the control system desires to perform. The first character string 41b has the relationship to be the same as a part of a second character string 38 b which will be described later.

The first character string 41b is positioned above the preceding vehicle icon 41a. More specifically, the first character string 41b is arranged at the uppermost position among positions of elements forming the first information image 41.

The mode display icon 41c is a figure indicating whether a mode is a hands-off mode or a hands-on mode. The hands-off mode is a mode (a first mode) in which the driver can release hands from the steering 1 during automatic driving. On the other hand, the hands-on mode is a mode (a second mode) in which the driver needs to slightly touch the steering 1 with the hands during automatic driving. The mode display icon 41c has two kinds of figures that are a first steering figure and a second steering figure. The first steering figure shows only the steering, and the second steering figure shows the steering and the hands slightly touching the steering. The first steering figure is used, if a current mode is the hands-off mode. The second steering figure is used, if the current mode is the hands-off mode. The first steering figure is displayed in blue, for example, and the second steering figure is displayed in green (only a steering portion), for example.

The first lane marker icon 41d is a figure showing left and right lane markers indicating boundaries of the host-vehicle lane. The left lane marker indicated in the first lane marker icon 41d indicates a boundary between the host-vehicle lane, and an adjacent lane or a road shoulder adjacent to the left side of the host-vehicle lane. Similarly, the right lane marker indicated in the first lane marker icon 41d indicates a boundary between the host-vehicle lane, and an adjacent lane or a road shoulder adjacent to the right side of the host-vehicle lane.

The arrow icon 41e is an arrow for guiding the automatic lane change. The arrow icon 41e has a shape that bends in the middle from a base end side of the arrow (a lower side of the figure) to a tip side of the arrow (an upper side of the figure). Further, the arrow icon 41e extends from the host-vehicle lane to the adjacent lane across the first lane marker icon 41d. That is, the arrow icon 41e schematically shows a state in which the host-vehicle makes a lane change by the automatic lane change, and guides the automatic lane change.

The first information image 41 shows a travelling state of a vehicle ahead of the host-vehicle with the preceding vehicle icon 41a and the first lane marker icon 41d. The first information image 41 is generated so as to represent the travelling state of the vehicle ahead of the host-vehicle when the driver looks in a forward direction.

In the first information image 41, the travelling state of the vehicle ahead of the host-vehicle is shown two-dimensionally. This is because the first information image 41 is displayed on the head-up display 40. That is, by using a two-dimensional representation, the amount of information is limited, and the visibility of the first information image 41 is enhanced.

The first information image 41 is generated at a predetermined timing, and each time the new first information image 41 is generated, the first information image 41 displayed on the head-up display 40 is updated.

The first information image 41 does not need to always include all of the preceding vehicle icon 41a, the first character string 41b, the mode display icon 41c, the first lane marker icon 41d, and the arrow icon 41e. The first information image 41 may include some or all of the preceding vehicle icon 41a, the first character string 41b, the mode display icon 41c, the first lane marker icon 41d, and the arrow icon 41e.

A real travelling state of an actually traveling host-vehicle is reflected in the travelling state of the vehicle ahead of the host-vehicle shown in the first information image 41. Therefore, if the preceding vehicle is not present actually, the first information image 41 does not include the preceding vehicle icon 41a.

The control contents of the control system are reflected in the first character string 41b and the arrow icon 41e. That is, if there is no request from the control system, the first information image 41 does not include the first character string 41b and the arrow icon 41e.

The second information image 38 is mainly composed of a host-vehicle icon 38a, a second character string 38b, a second lane marker icon 38c, and a surrounding vehicle icon 38d.

The host-vehicle icon 38a is a figure indicating the host-vehicle.

The second character string 38b includes one or more characters such as hiragana characters, Chinese characters, numbers and symbols, and is, for example, a sentence. Further, the second character string 38b may include emoji (a pictogram) that plays the same role as the character.

Similarly to the first character string 41b, the second character string 38b indicates the contents notified to the driver by the control system. Specifically, the second character string 38b includes the first character string 41b and another character string (a third character string). The contents of the third character string are the reason why the first character string 41b is notified. That is, the control system uses the second character string 38b to notify the driver of the request from the control system, or what the control system desires to perform, and the reason thereof. The second character string 38b has a larger amount of information than the first character string 41b in that the second character string 38b includes the third character string in addition to the first character string 41b.

In this way, the second character string 38b includes the first character string 41b. The inclusion of the first character string 41b in the second character string 38b does not mean that the element (the first character string 41b) displayed on the first information image 41 is regarded as a part of the second character string 38b. Instead of the above, the above inclusion means that the second character string 38b includes a character string in which a string of characters is the same as the first character string 41b. However, the second character string 38b described above is merely an example, and may be composed of any characters (sentences) without being restricted by such conditions.

The second character string 38b is positioned below the host-vehicle icon 38a. In other words, the second character string 38b is arranged at the lowermost position among positions of the elements forming the second information image 38.

The second lane marker icon 38c is a figure indicating lane markers showing boundaries of one or more lanes in the road on which the host-vehicle travels.

The surrounding vehicle icon 38d is a figure showing a surrounding vehicle traveling around the host-vehicle. The surrounding vehicle includes the preceding vehicle, and an adjacent vehicle traveling on the adjacent lane.

The second information image 38 shows travelling states of the host-vehicle, and a vehicle around the host-vehicle with the host-vehicle icon 38a, the second lane marker icon 38c, and a surrounding vehicle icon 38d. The surroundings of the host-vehicle include each of a space in a forward direction of the host-vehicle, spaces in left and right lateral directions of the host-vehicle, and a space in a backward direction of the host-vehicle. The second information image 38 is generated so as to represent the travelling state of the vehicle around the host-vehicle when the host-vehicle is viewed from positions above and behind the host-vehicle. It is enough if the viewpoint showing the travelling state is at least above the host-vehicle, because the purpose is to grasp the travelling state of the vehicle around the host-vehicle.

In the second information image 38, the travelling state of the vehicle around the host-vehicle is shown three-dimensionally. The use of the three-dimensional representation further increases the amount of information than the two-dimensional representation. Accordingly, the second information image 38 can deliver more various pieces of information to the driver than the first information image 41.

The second information image 38 is generated at a predetermined timing, and each time the new second information image 38 is generated, the second information image 38 displayed on the meter display 35 is updated.

The second information image 38 does not need to always include all of the host-vehicle icon 38a, the second character string 38b, the second lane marker icon 38c, and the surrounding vehicle icon 38d. The second information image 38 may include a part or all of the host-vehicle icon 38a, the second character string 38b, the second lane marker icon 38c, and the surrounding vehicle icon 38d.

The real travelling state of the actually traveling host-vehicle is reflected in the travelling state of the vehicle around the host-vehicle shown by the second information image 38. Therefore, if the surrounding vehicle is not present actually, the second information image 38 does not include the surrounding vehicle icon 38*d*. Further, the second lane marker icon 38*c* corresponds to the number of lanes in the road on which the host-vehicle actually travels.

The control contents of the control system are reflected in the second character string 38*b*. That is, if there is no request from the control system, the second information image 38 does not include the second character string 38*b*.

Referring again to FIG. 1, the controller 10 will be described in detail. The controller 10 includes, as the plurality of information processing circuits, a route generation unit 11, an automatic traveling processing unit 12, a vehicle control unit 13, an image generation unit 14, a display control unit 15, a speaker control unit 16, and a winker control unit 17.

The route generation unit 11 generates a route to a destination preset by the driver. The route generation unit 11 outputs the generated route to the automatic traveling processing unit 12. The route generation unit 11 may acquire a route generated by an external device.

The automatic traveling processing unit 12 performs various processes necessary for performing the automatic lane change. The automatic lane change includes a state of a system proposal in which the automatic traveling processing unit 12 (the control system) makes the proposal to the driver to perform the automatic lane change, and a state of a driver proposal in which the automatic lane change is performed in response to the reception of the proposal made by the driver.

The automatic lane change proposed by the system occurs if it is determined that a lane change is necessary to overtake the preceding vehicle. In addition to the above, the automatic lane change proposed by the system occurs if it is determined that the lane change is necessary to maintain the route generated by the route generation unit 11. On the other hand, the automatic lane change proposed by the driver occurs if the driver operates the winker switch 26 in a direction of a lane to which the driver desires to move.

The automatic traveling processing unit 12 calculates a position of the host-vehicle, a position of the surrounding vehicle, a relative speed between the host-vehicle and the preceding vehicle, and the like based on pieces of information output by the host-vehicle position estimating device 20, the map acquisition device 21, the surrounding information detection device 22, and the vehicle speed sensor 23. The automatic traveling processing unit 12 performs necessary calculations based on the position of the host-vehicle, the position of the surrounding vehicle, the relative speed between the host-vehicle and the preceding vehicle, the route generated by the route generation unit 11, and the like. The calculations made by the automatic traveling processing unit 12 also use pieces of information output by the steering switch 24, the touch sensor 25, and the winker switch 26. Further, the automatic traveling processing unit 12 outputs control commands necessary for the automatic lane change, and processes associated therewith to the vehicle control unit 13, the image generation unit 14, the display control unit 15, the speaker control unit 16, and the winker control unit 17.

The vehicle control unit 13 controls the steering actuator 30 and the like in response to the control command from the automatic traveling processing unit 12. The steering actuator 30 or the like operates in accordance with the control by the vehicle control unit 13. Accordingly, the behavior of the host-vehicle is controlled, and this enables performing of the automatic lane change.

The image generation unit 14 generates the first information image 41 and the second information image 38. The first information image 41 is generated so as to represent the travelling state of the vehicle ahead of the host-vehicle based on pieces of information output by the host-vehicle position estimating device 20, the map acquisition device 21, the surrounding information detection device 22, and the vehicle speed sensor 23. Similarly, the second information image 38 is generated so as to represent the travelling state of the vehicle around the host-vehicle based on the pieces of information output by the host-vehicle position estimating device 20, the map acquisition device 21, the surrounding information detection device 22, and the vehicle speed sensor 23.

In addition, the image generation unit 14 generates the first information image 41 so as to include the first character string 41*b* based on the control command from the automatic traveling processing unit 12, that is, information to be notified to the driver. Similarly, the image generation unit 14 generates the second information image 38 so as to include the second character string 38*b* based on the control command from the automatic traveling processing unit 12, that is, the information to be notified to the driver.

The display control unit 15 displays the first information image 41 generated by the image generation unit 14 on the head-up display 40. Further, the display control unit 15 displays the second information image 38 generated by the image generation unit 14 on the meter display 35.

The speaker control unit 16 controls a speaker 33 in response to the control command from the automatic traveling processing unit 12. By being controlled by the speaker control unit 16, the speaker 33 outputs a notification sound to the driver.

The winker control unit 17 controls the winker 34 in response to the control command from the automatic traveling processing unit 12. The control of the winker 34 by the speaker control unit 16 operates either left or right winker 34.

A display control device according to the present embodiment includes the image generation unit 14 and the display control unit 15 among the plurality of information processing circuits constituting the controller 10. A display control method according to the present embodiment includes various processes performed by the image generation unit 14 and the display control unit 15.

Hereinafter, with reference to FIGS. 4A and 4B, flows of the automatic lane change proposed by the system will be described by taking an example of a situation in which the host-vehicle overtakes the preceding vehicle.

Figure 4A:
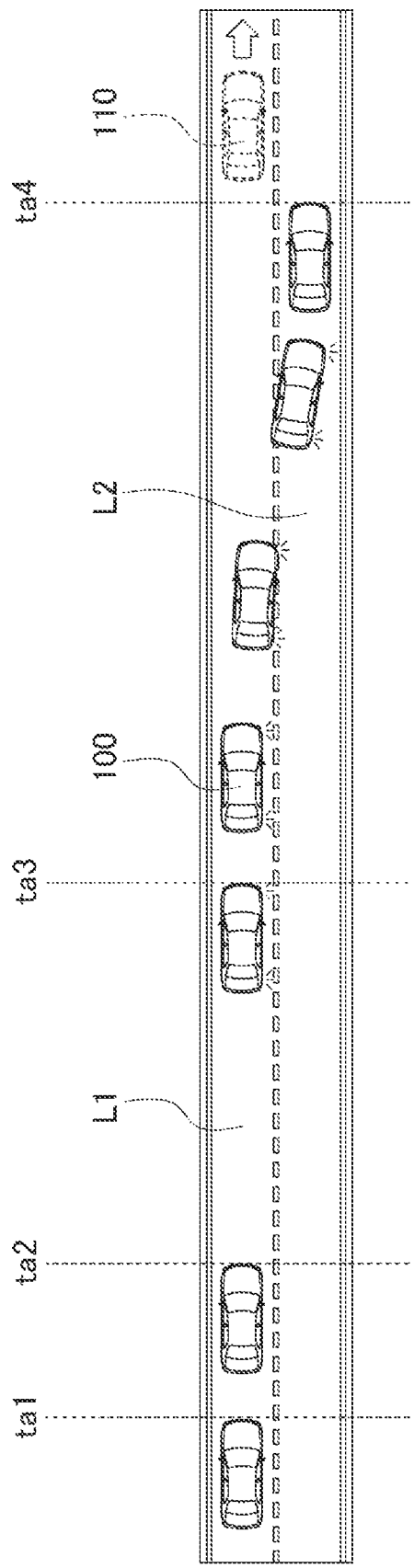
FIG. 4A is an explanatory diagram for showing a series of movements from a first lane to a second lane of a host-vehicle in a situation of overtaking a preceding vehicle by the automatic lane change proposed by a system.

As shown in FIG. 4A, a host-vehicle 100 performs the automatic lane change from a first lane L1 to a second lane L2 adjacent to the right side of the first lane L1 in order to overtake a preceding vehicle 110 traveling on the first lane L1. In this automatic lane change, control flows by the automatic traveling processing unit 12 include the following.

(1) The unit proposes the driver to perform the automatic lane change (a timing ta1).

(2) The unit receives the driver's consent to perform the automatic lane change (a timing ta2).

(3) Prior to the start of the automatic lane change, the unit actuates the winker 34 in a direction of a lane to which the host-vehicle is to be moved (a timing ta3).

(4) The unit completes the automatic lane change (a timing ta4)

As shown in FIG. 4B, the host-vehicle 100 performs the automatic lane change from the second lane L2 to the first lane L1 after overtaking the preceding vehicle 110 by travelling on the second lane L2. In this automatic lane change, control flows by the automatic traveling processing unit 12 include the following.

(1) The unit proposes the driver to perform the automatic lane change (a timing ta5)
(2) The unit receives the driver's consent to perform the automatic lane change (a timing tab)
(3) Prior to the start of the automatic lane change, the unit actuates the winker 34 in a direction of a lane to which the host-vehicle is to be moved (a timing ta7).
(4) The unit completes the automatic lane change (a timing ta8)

The control performed by the automatic traveling processing unit 12 in accordance with the automatic lane change, and the processes associated therewith includes a plurality of processes as described above. The first information image 41 displayed on the head-up display 40, and the second information image 38 displayed on the meter display 35 are changed depending on each process of the control.

In the case of performing the automatic lane change from the first lane L1 to the second lane L2, the first information image 41 and the second information image 38 are changed depending on five processes.

Figure 5A:
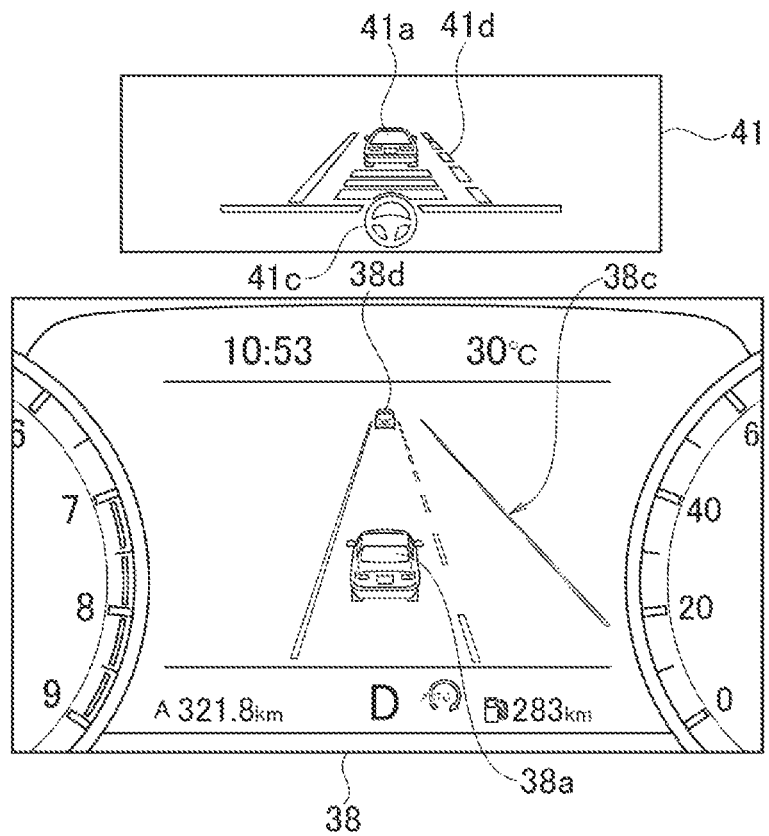
FIG. 5A is an explanatory diagram for showing an example of a first information image and a second information image displayed when the automatic lane change proposed by a system is performed.
Figure 5B:
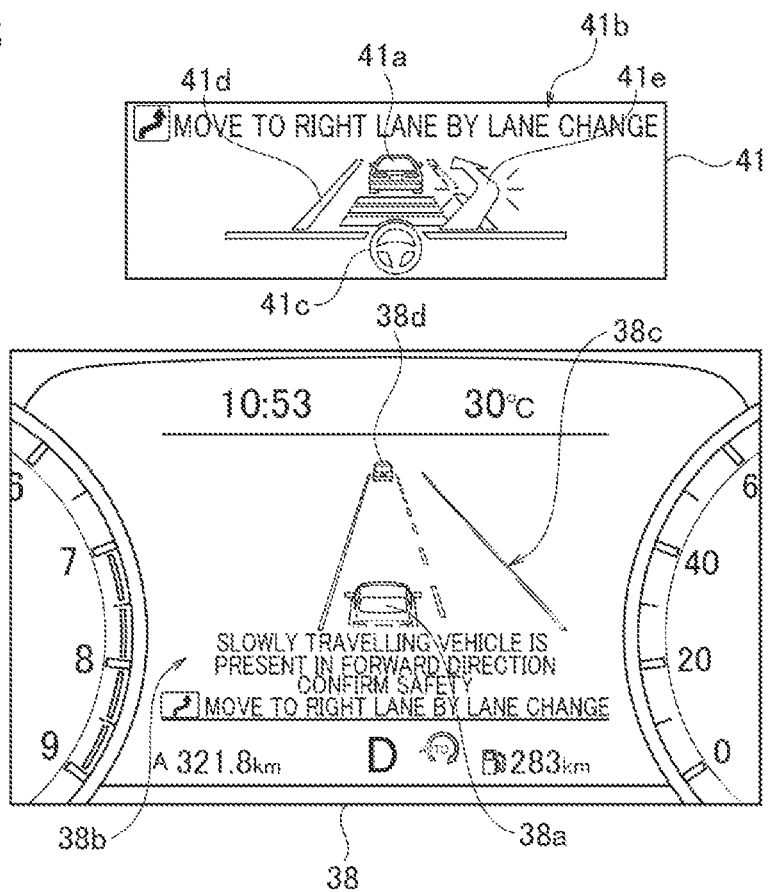
FIG. 5B is an explanatory diagram for showing an example of a first information image and a second information image displayed when the automatic lane change proposed by a system is performed.
Figure 5C:
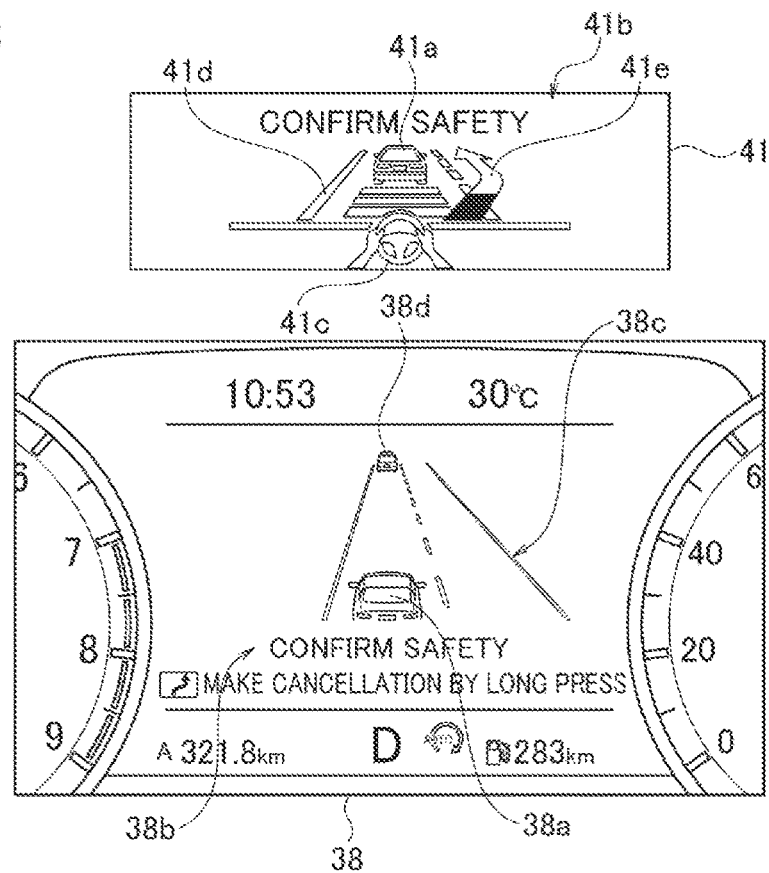
FIG. 5C is an explanatory diagram for showing an example of a first information image and a second information image displayed when the automatic lane change proposed by a system is performed.
Figure 5D:
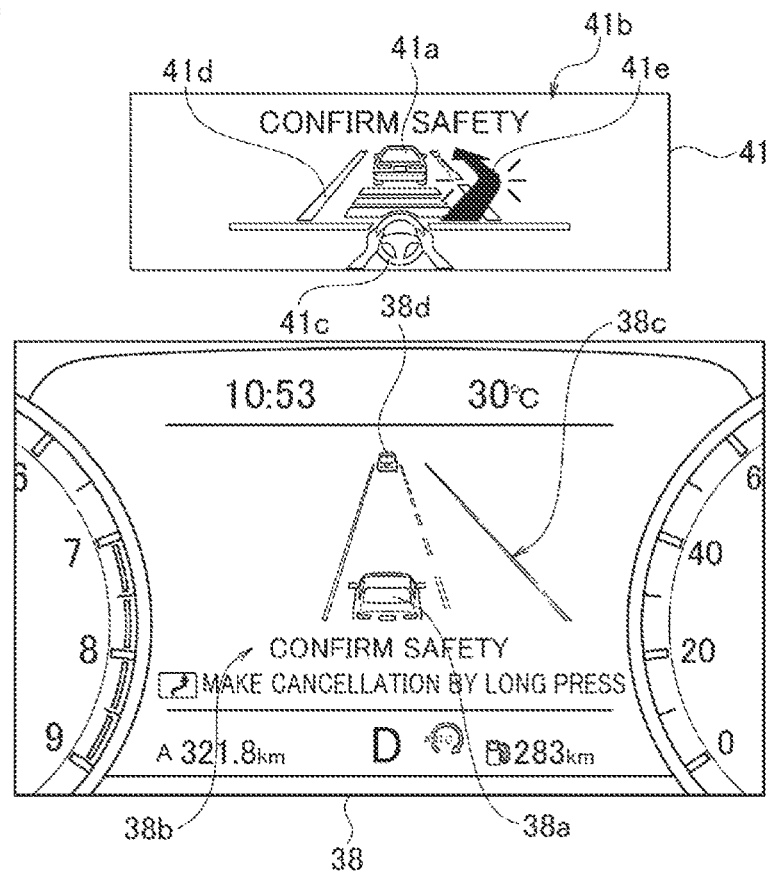
FIG. 5D is an explanatory diagram for showing an example of a first information image and a second information image displayed when the automatic lane change proposed by a system is performed.
Figure 5E:
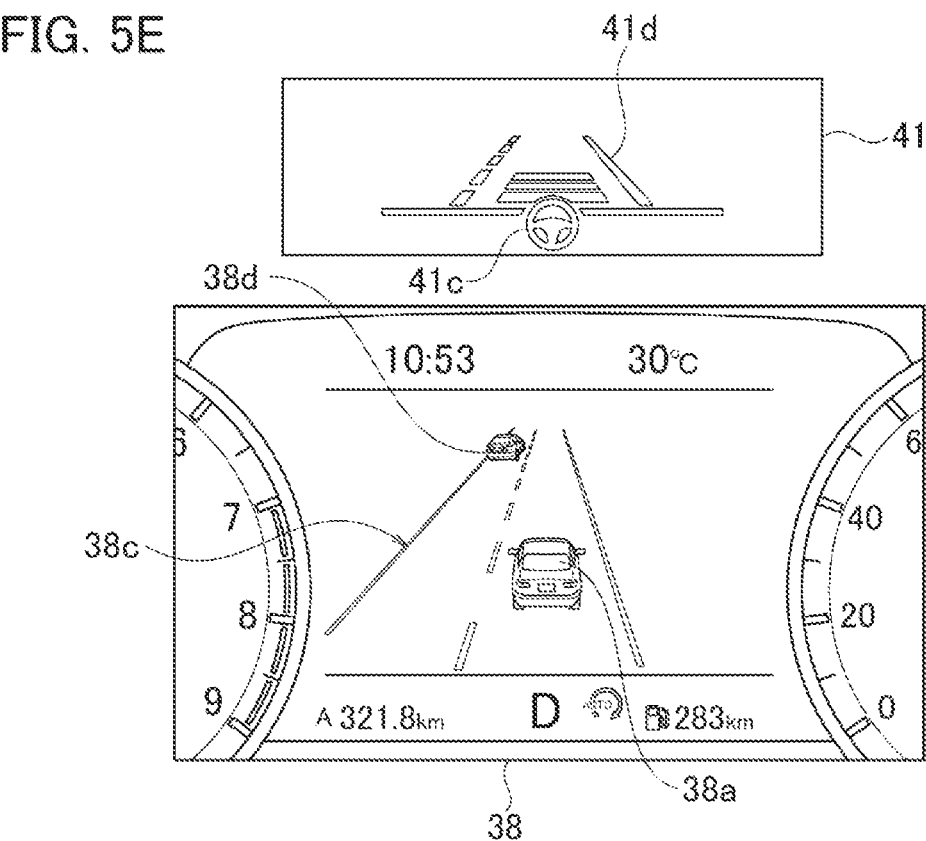
FIG. 5E is an explanatory diagram for showing an example of a first information image and a second information image displayed when the automatic lane change proposed by a system is performed.

During a process up to the timing ta1, the first information image 41 and the second information image 38 are mainly composed of contents indicating the travelling state (FIG. 5A). During a process from the timing ta1 to before the timing ta2, the first information image 41 and the second information image 38 are mainly composed of the contents indicating the travelling state, and contents for proposing the automatic lane change to the driver (FIG. 5B). During a process from the timing ta2 to before the timing ta3, the first information image 41 and the second information image 38 are mainly composed of the contents indicating the travelling state, and contents indicating that the driver's consent for the automatic lane change is received (FIG. 5C). During a process from the timing ta3 to before the timing ta4, the first information image 41 and the second information image 38 are mainly composed of the contents indicating the travelling state, and contents indicating that the automatic lane change is performed (FIG. 5D). During a process at or after the timing ta4, the first information image 41 and the second information image 38 are mainly composed of the contents indicating the travelling state (FIG. 5E).

In the case of performing the automatic lane change from the second lane L2 to the first lane L1, the first information image 41 and the second information image 38 are changed depending on five processes.

Figure 6A:
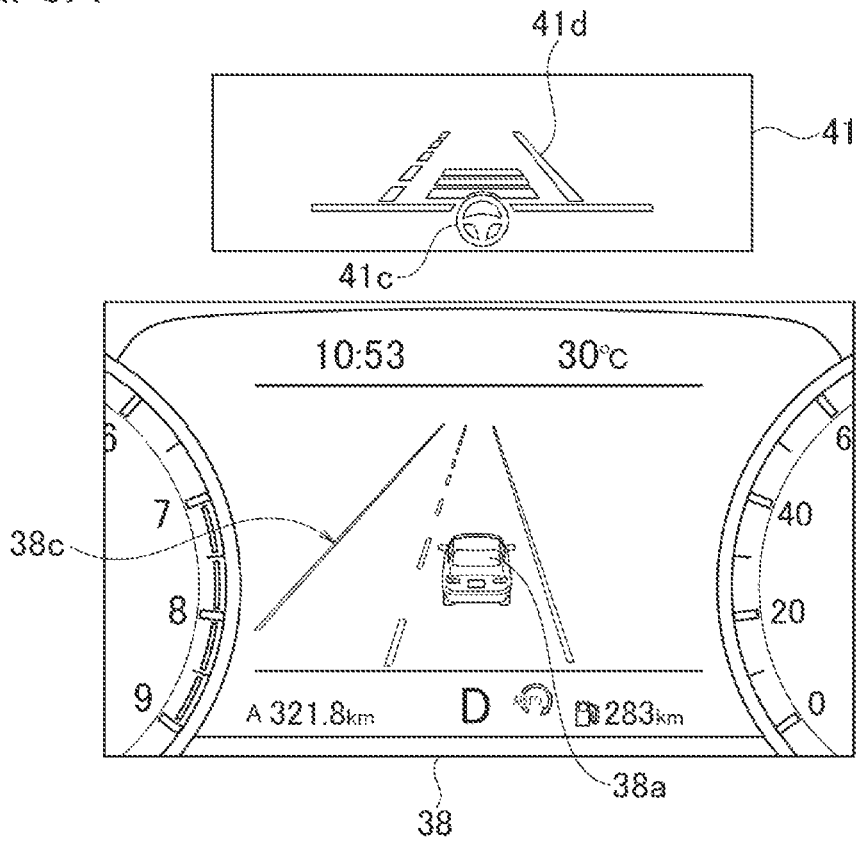
FIG. 6A is an explanatory diagram for showing an example of a first information image and a second information image displayed when the automatic lane change proposed by a system is performed.
Figure 6B:
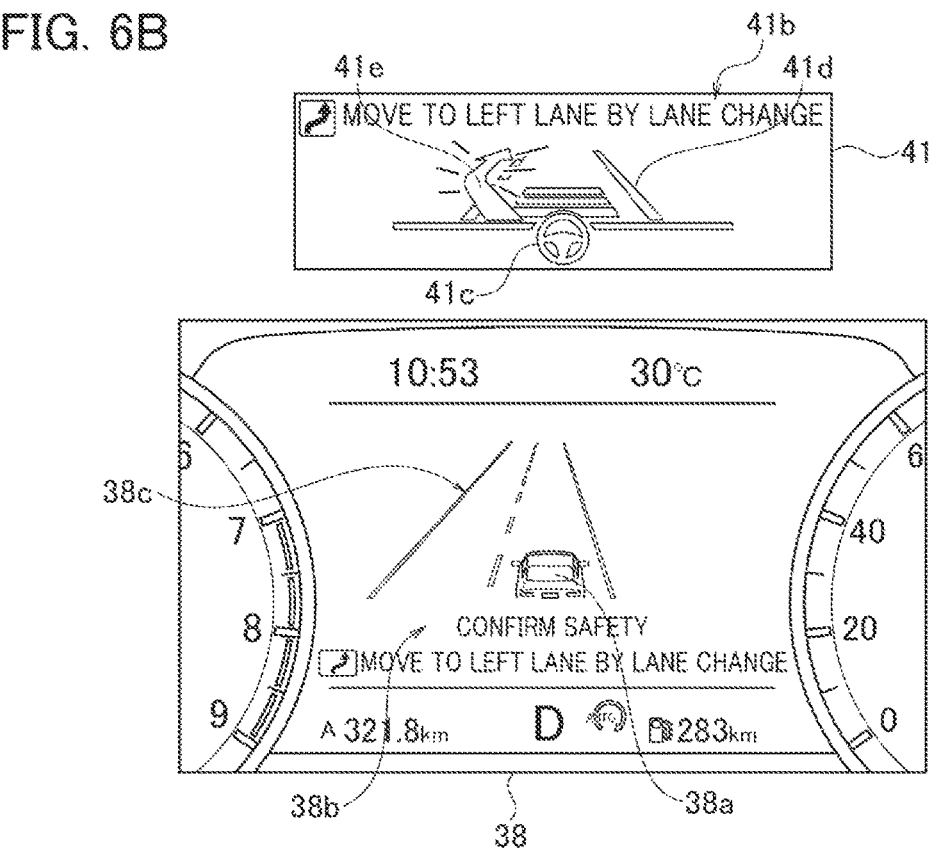
FIG. 6B is an explanatory diagram for showing an example of a first information image and a second information image displayed when the automatic lane change proposed by a system is performed.
Figure 6C:
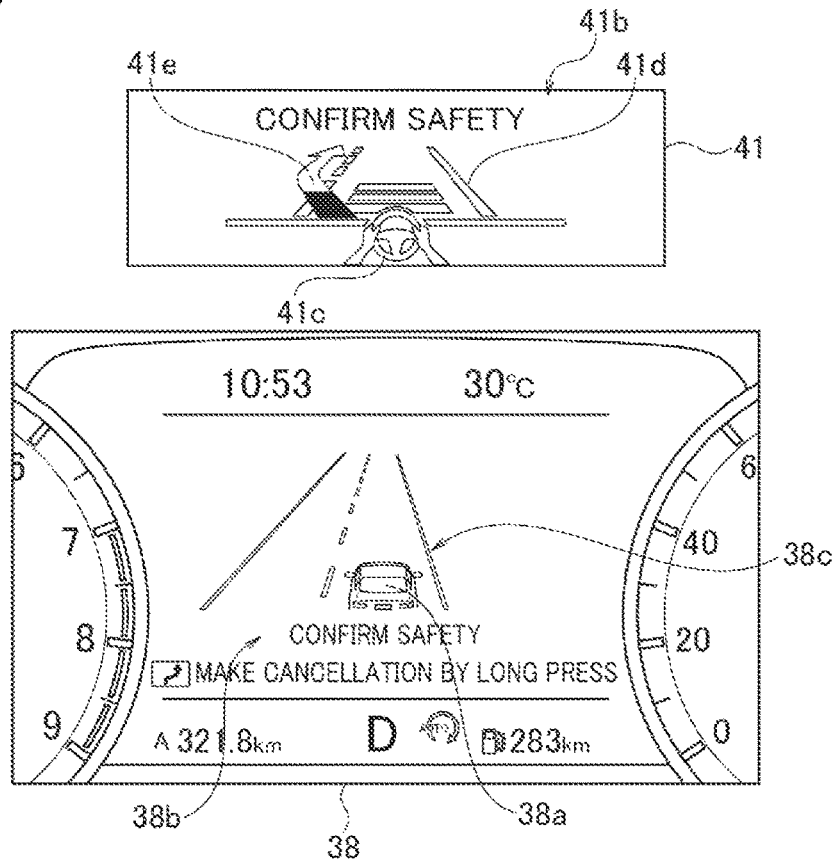
FIG. 6C is an explanatory diagram for showing an example of a first information image and a second information image displayed when the automatic lane change proposed by a system is performed.
Figure 6D:
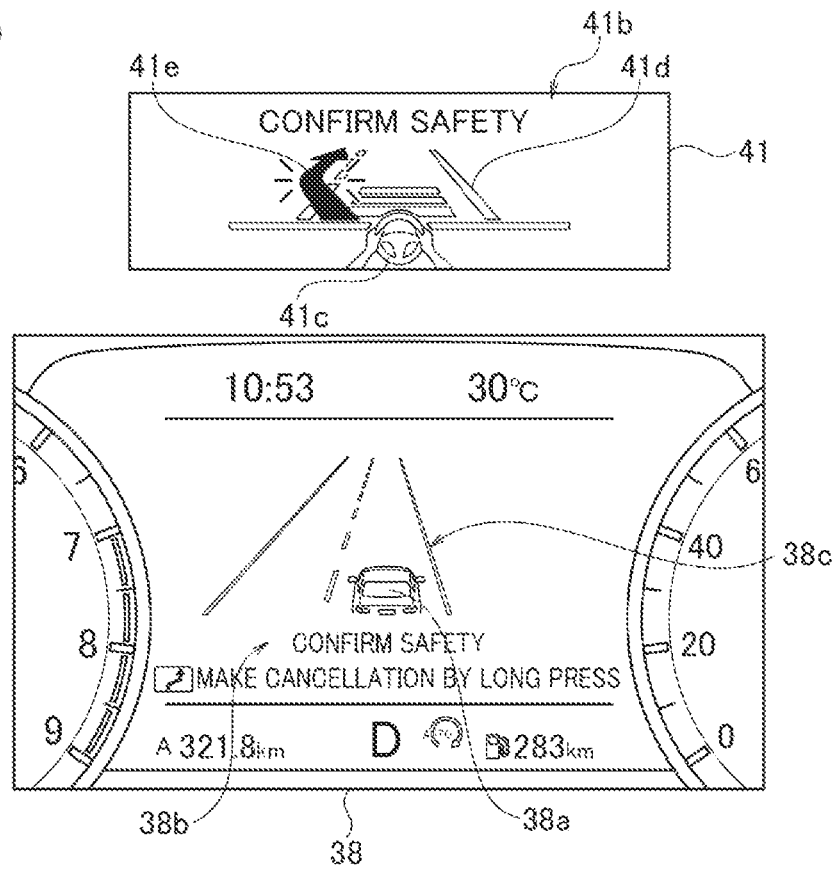
FIG. 6D is an explanatory diagram for showing an example of a first information image and a second information image displayed when the automatic lane change proposed by a system is performed.
Figure 6E:
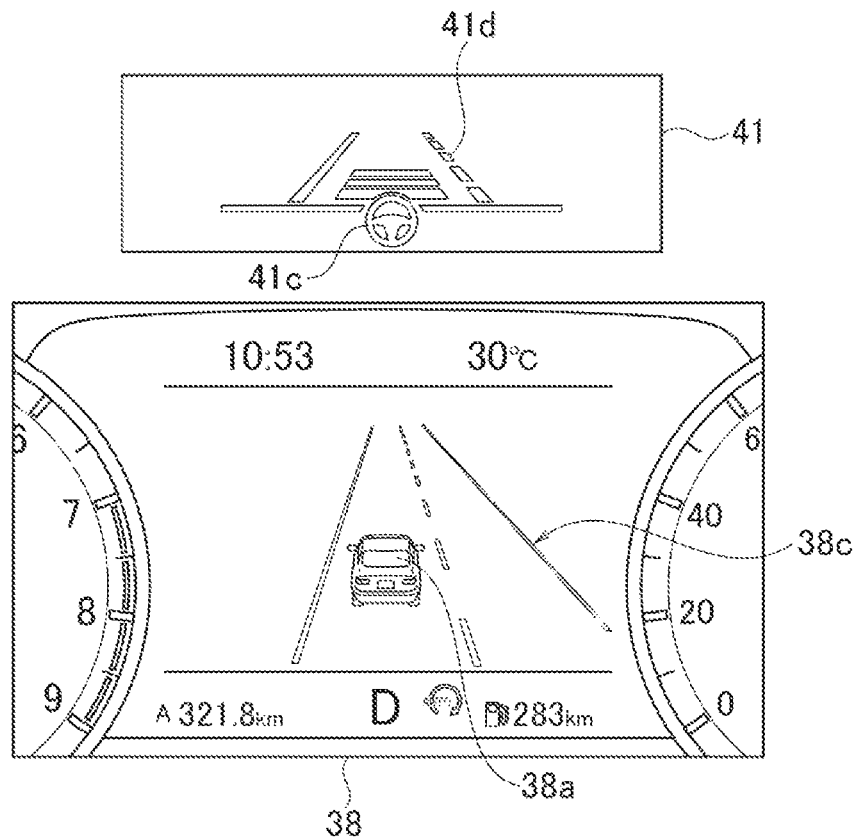
FIG. 6E is an explanatory diagram for showing an example of a first information image and a second information image displayed when the automatic lane change proposed by a system is performed.

During a process up to the timing ta5, the first information image 41 and the second information image 38 are mainly composed of contents indicating the travelling state (FIG. 6A). During a process from the timing ta5 to before the timing ta6, the first information image 41 and the second information image 38 are mainly composed of the contents indicating the travelling state, and contents for proposing the automatic lane change to the driver (FIG. 6B). During a process from the timing ta6 to before the timing ta7, the first information image 41 and the second information image 38 are mainly composed of the contents indicating the travelling state, and contents indicating that the driver's consent for the automatic lane change is received (FIG. 6C). During a process from the timing ta7 to before the timing ta8, the first information image 41 and the second information image 38 are mainly composed of the contents indicating the travelling state, and contents indicating that the automatic lane change is performed (FIG. 6D). During a process at or after the timing ta8, the first information image 41 and the second information image 38 are mainly composed of the contents indicating the travelling state (FIG. 6E).

As shown in FIGS. 5A to 5E, and FIGS. 6A to 6E, the first information image 41 includes the preceding vehicle icon 41a, and the first lane marker icon 41d, and shows the travelling state of the vehicle ahead of the host-vehicle 100. Further, the second information image 38 includes the host-vehicle icon 38a, the second lane marker icon 38c, and the surrounding vehicle icon 38d, and shows the travelling state of the vehicle around the host-vehicle 100.

The first information image 41 includes the first character string 41b, and the second information image 38 includes the second character string 38b. An example of the first character string 41b and the second character string 38b will be described below.

In FIG. 5B, the first character string 41b is a character string "(Pictogram) Move to a right lane by lane change". The pictogram in the first character string 41b corresponds to a pictogram marked on the steering switch 24, and has the meaning to urge the operation of the steering switch 24 (the same applies hereinafter). The character string "(Pictogram) Move to a right lane by lane change" proposes the automatic lane change to the driver.

In FIG. 5B, the second character string 38b includes a character string "A slowly travelling vehicle is present in a forward direction", a character string "Confirm the safety", and a character string "(Pictogram) Move to a right lane by lane change". The character string "(Pictogram) Move to a right lane by lane change" indicates contents for proposing the automatic lane change to the driver. The character string "A slowly travelling vehicle is present in a forward direction" indicates the reason why the automatic lane change is proposed. The character string "Confirm the safety" indicates the contents for proposing the safety confirmation to the driver. As described above, the second character string 38b includes the first character string 41b ("(Pictogram) Move to a right lane by lane change"). In other words, the first character string 41b is the same as a part of the second character string 38b.

On the other hand, in FIG. 6B, the first character string 41b is a character string "(Pictogram) Move to a left lane by lane change". The character string "(Pictogram) Move to a left lane by lane change" indicates contents for proposing the automatic lane change to the driver.

In FIG. 6B, the second character string 38b includes a character string "Confirm the safety" and a character string "(Pictogram) Move to a left lane by lane change". The character string "(Pictogram) Move to a left lane by lane change" indicates contents for proposing the automatic lane change to the driver. The character string "Confirm the safety" indicates contents for proposing the safety confirmation to the driver. In this way, the second character string 38b includes the first character string 41b.

However, the display scene in FIG. 6B corresponds to the lane change from the second lane L2 to the first lane L1 (second automatic lane change) following the lane change from the first lane L1 to the second lane L2 (first automatic lane change). The second automatic lane change is performed to return to the first lane L1 on which the host-vehicle 100 was originally travelling. Therefore, it is considered that the driver has already grasped the reason why the second automatic lane change is performed. Accordingly, in the case of the second automatic lane change, the second character string 38b does not include a character string indicating a reason.

The image generation unit 14 and the display control unit 15 generate and display the first information image 41 and the second information image 38 in response to the control command from the automatic traveling processing unit 12, as described above. At this time, the display control unit 15 displays the first information image 41 and the second information image 38 such that the first character string 41b and the second character string 38b are displayed at the same time.

The speaker control unit 16 controls the speaker 33 in response to the control command from the automatic traveling processing unit 12. This causes the speaker 33 to output the notification sound to the driver in accordance with the display of the first character string 41b and the second character string 38b.

Figure 7:
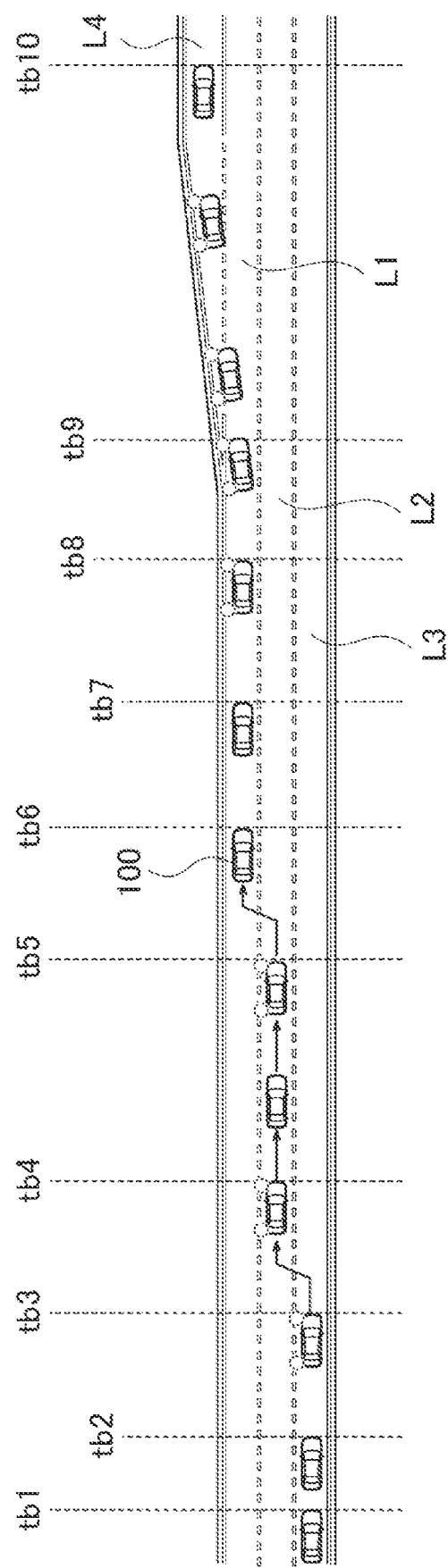
FIG. 7 is an explanatory diagram for showing a series of movements from a third lane to an exit path of a host-vehicle in a situation of performing the automatic lane change along a route.

Next, with reference to FIG. 7, flows of the automatic lane change proposed by the system will be described by taking an example of a situation in which the route generated by the route generation unit 11 is maintained. In order to reach an exit path L4 branching from a main road, the host-vehicle 100 performs the automatic lane change from a third lane L3 to the second lane L2, then, from the second lane L2 to the first lane L1, and then from the first lane L1 to the exit path L4.

In this automatic lane change, control flows of the automatic traveling processing unit 12 include the following.
(1) The unit proposes the driver to perform the automatic lane change (a timing tb1).
(2) The unit receives the driver's consent to perform the automatic lane change (a timing tb2)
(3) Prior to the start of the automatic lane change to the second lane L2, the unit actuates the winker 34 in a direction of a lane to which the host-vehicle is to be moved (a timing tb3).
(4) The unit completes the automatic lane change to the second lane L2 (a timing tb4).
(5) Prior to the start of the automatic lane change to the first lane L1, the unit actuates the winker 34 in a direction of a lane to which the host-vehicle is to be moved (a timing tb5).
(6) The unit completes the automatic lane change to the first lane L1 (a timing tb6).
(7) The unit determines that the distance between a branch point of the exit path L4, and the host-vehicle 100 becomes a predetermined first distance (a timing tb7).
(8) Prior to the start of the automatic lane change to the exit path L4, the unit actuates the winker 34 in a direction of the exit path L4 to which the host-vehicle is to be travelled (a timing tb8).
(9) The unit determines that the host-vehicle 100 has reached the branch point (a timing tb9).
(10) The unit completes the automatic lane change to the exit path L4 (a timing tb 10).

The control performed by the automatic traveling processing unit 12 in accordance with the automatic lane change, and the processes associated therewith includes a plurality of processes as described above. The first information image 41 displayed on the head-up display 40, and the second information image 38 displayed on the meter display 35 are changed depending on each process of the control.

In the automatic lane change from the third lane L3 to the exit path L4, the first information image 41 and the second information image 38 are changed depending on 11 processes.

Figure 8A:
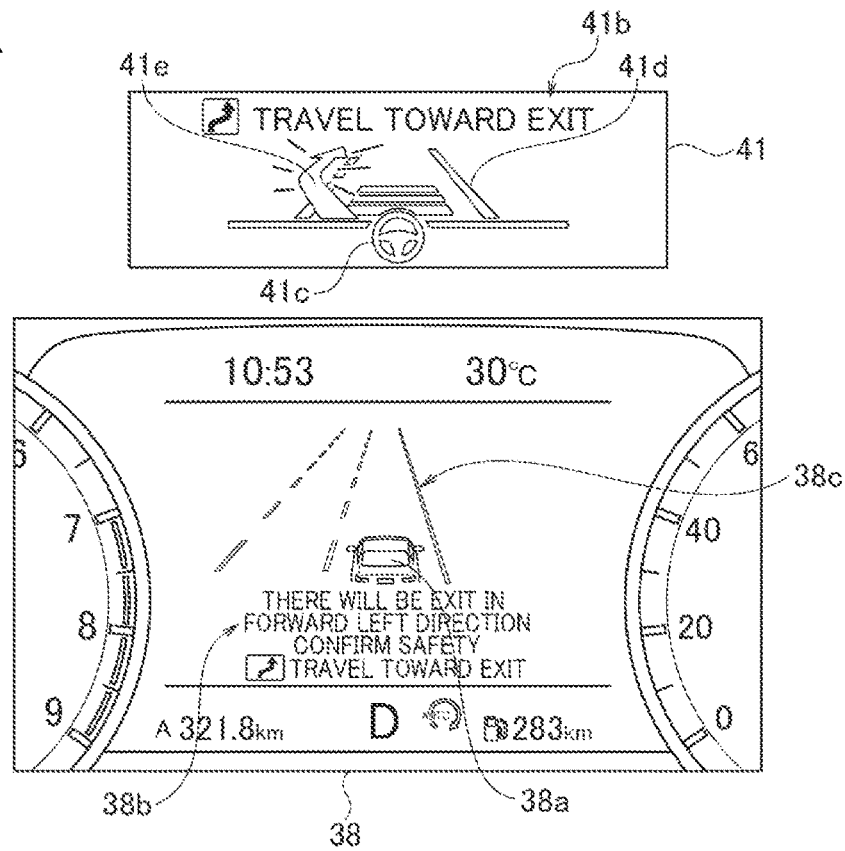
FIG. 8A is an explanatory diagram for showing an example of a first information image and a second information image displayed when the automatic lane change is performed along a route.
Figure 8B:
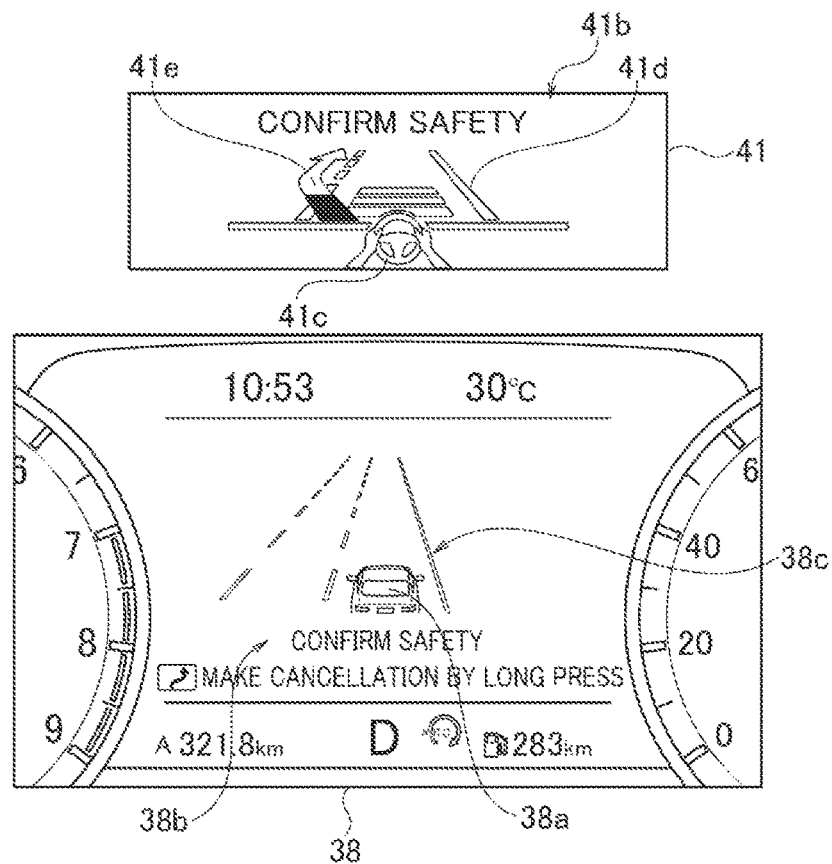
FIG. 8B is an explanatory diagram for showing an example of a first information image and a second information image displayed when the automatic lane change is performed along a route.
Figure 8C:
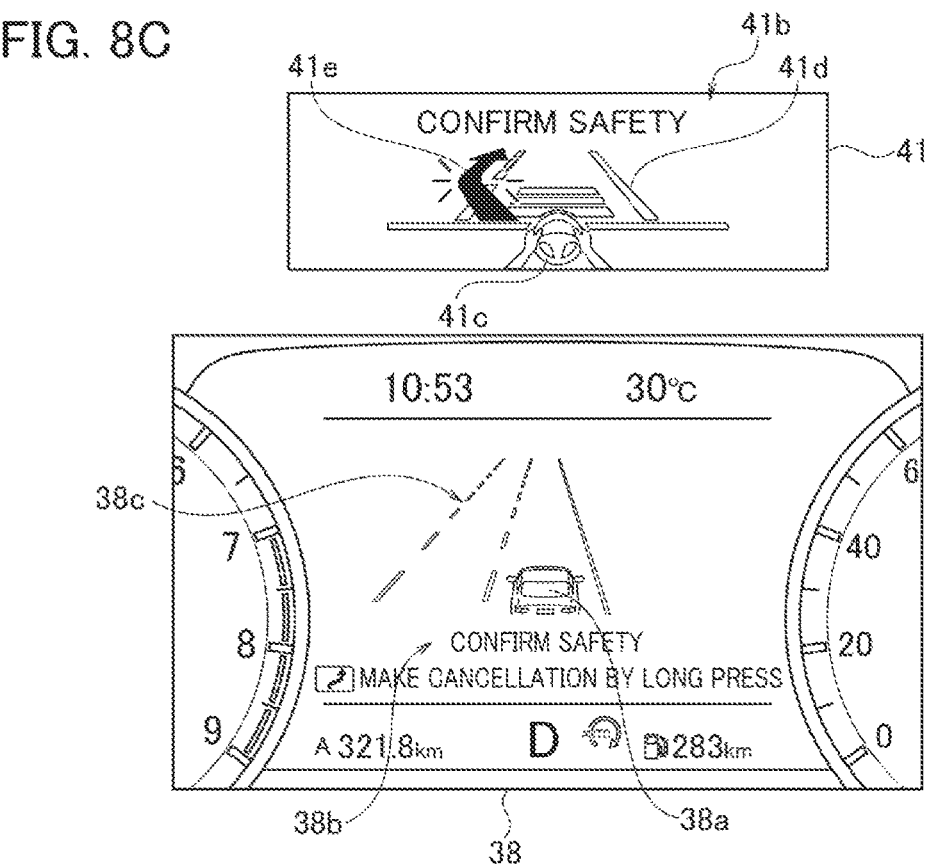
FIG. 8C is an explanatory diagram showing an example of a first information image and a second information image displayed when the automatic lane change is performed along a route.

During a process up to the timing tb1, the first information image 41 and the second information image 38 are mainly composed of contents indicating the travelling state (not shown). During a process from the timing tb1 to before the timing tb2, the first information image 41 and the second information image 38 are mainly composed of the contents indicating the travelling state, and contents for proposing the automatic lane change to the driver (FIG. 8A). During a process from the timing tb2 to before the timing tb3, the first information image 41 and the second information image 38 are mainly composed of the contents indicating the travelling state, and contents indicating that the driver's consent for the automatic lane change is received (FIG. 8B). During a process from the timing tb3 to before the timing tb4, the first information image 41 and the second information image 38 are mainly composed of the contents indicating the travelling state, and contents indicating that the automatic lane change is performed (FIG. 8C).

Figure 8D:
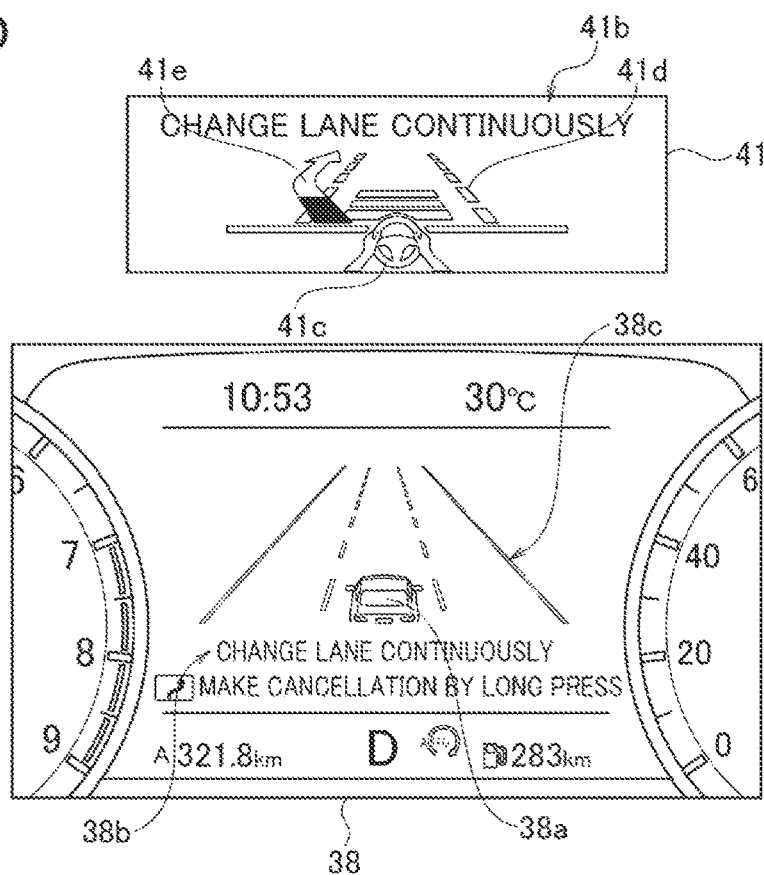
FIG. 8D is an explanatory diagram for showing an example of a first information image and a second information image displayed when the automatic lane change is performed along a route.
Figure 8E:
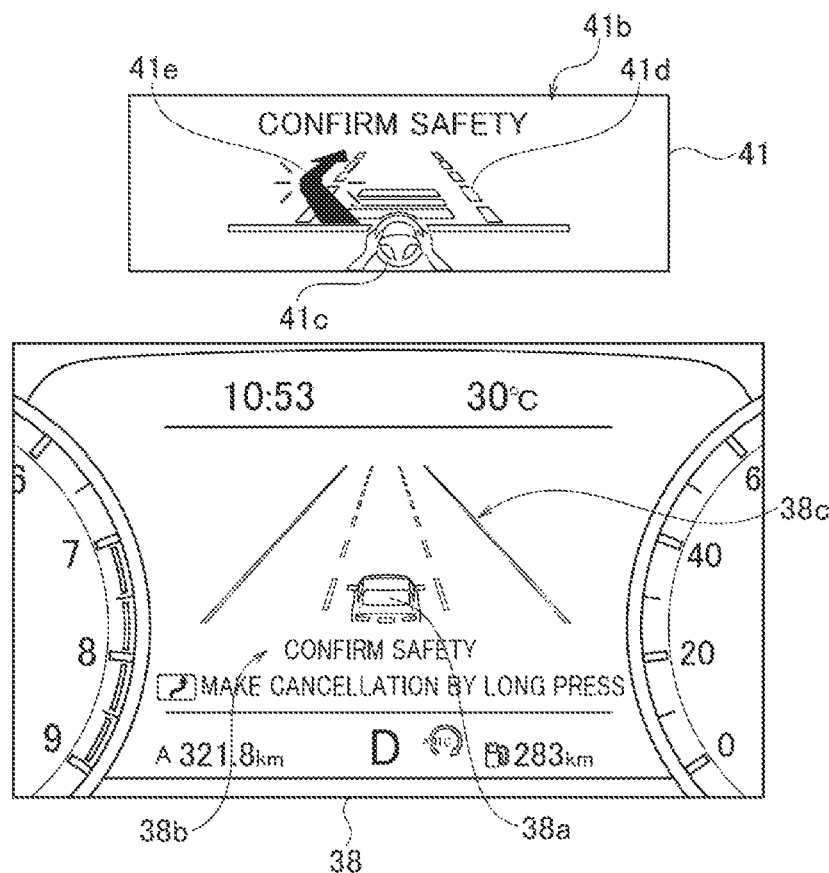
FIG. 8E is an explanatory diagram for showing an example of a first information image and a second information image displayed when the automatic lane change is performed along a route.
Figure 8F:
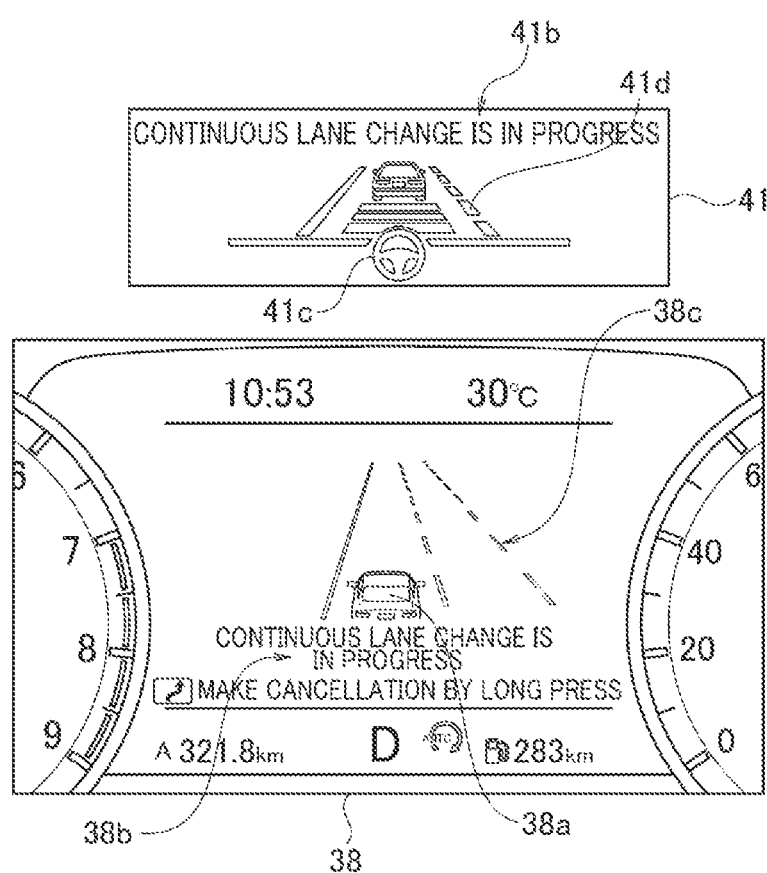
FIG. 8F is an explanatory diagram for showing an example of a first information image and a second information image displayed when the automatic lane change is performed along a route.

During a process from the timing tb4 to before the timing tb5, the first information image 41 and the second information image 38 are mainly composed of the contents indicating the travelling state, and contents for notifying the second automatic lane change (FIG. 8D). During a process from the timing tb5 to before the timing tb6, the first information image 41 and the second information image 38 are mainly composed of the contents indicating the travelling state, and contents indicating that the automatic lane change is performed (FIG. 8E). During a process from the timing tb6 to before the timing tb7, the first information image 41 and the second information image 38 are mainly composed of the contents indicating the travelling state, and contents indicating that the automatic lane change is continuously performed (FIG. 8F).

Figure 8G:
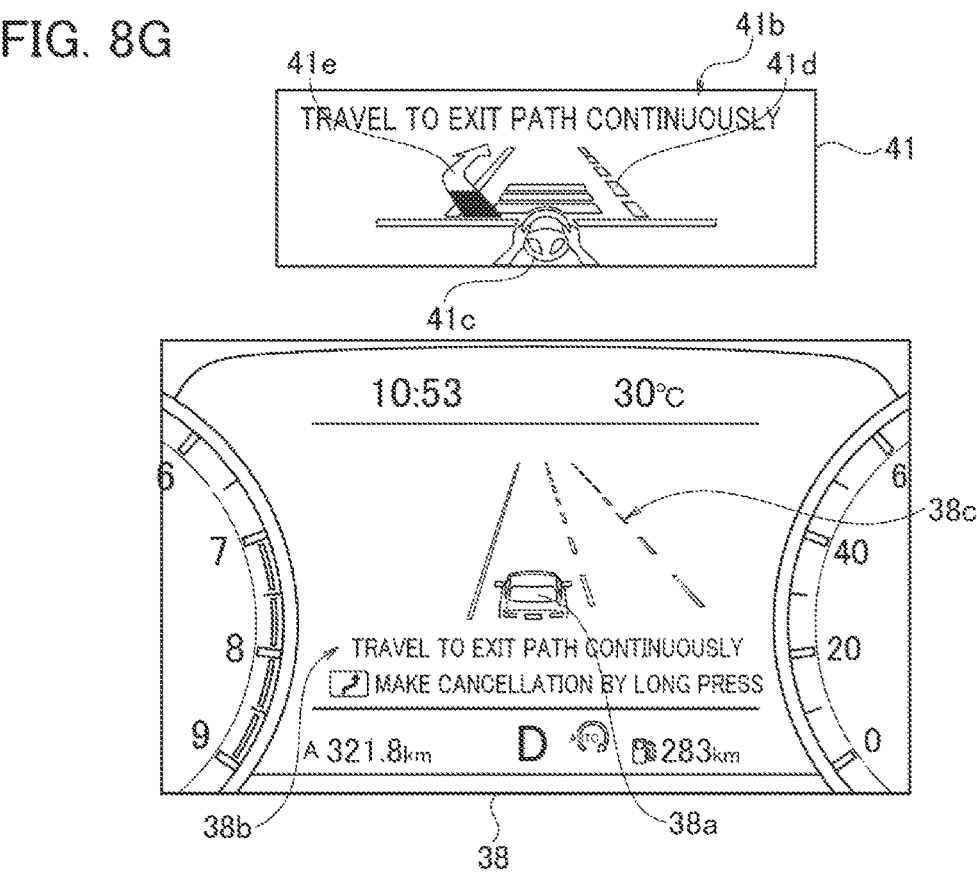
FIG. 8G is an explanatory diagram for showing an example of a first information image and a second information image displayed when the automatic lane change is performed along a route.
Figure 8H:
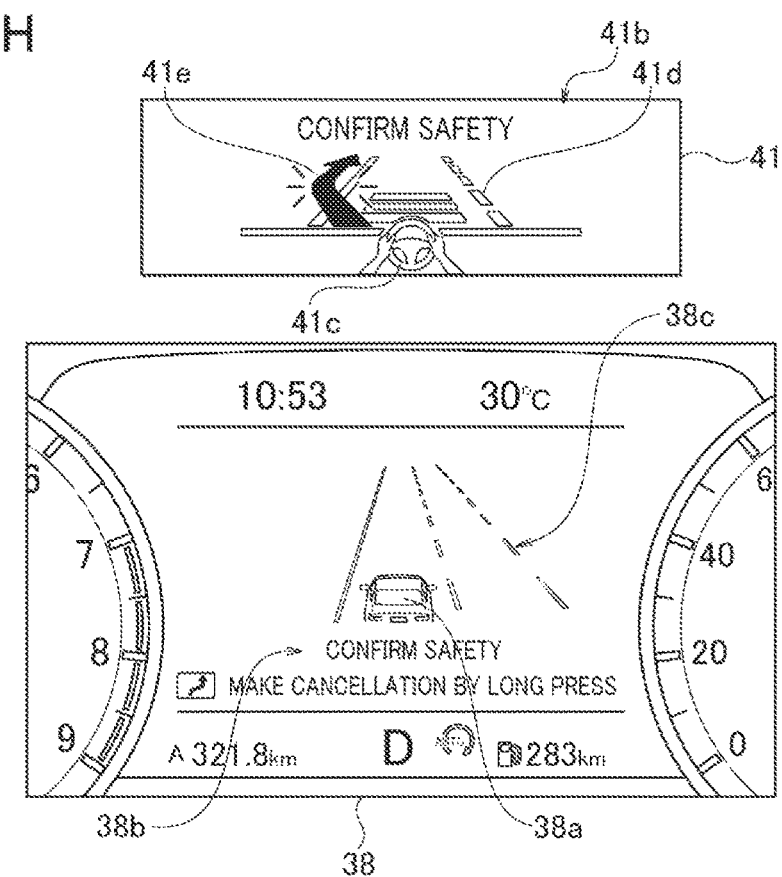
FIG. 8H is an explanatory diagram for showing an example of a first information image and a second information image displayed when the automatic lane change is performed along a route.
Figure 8I:
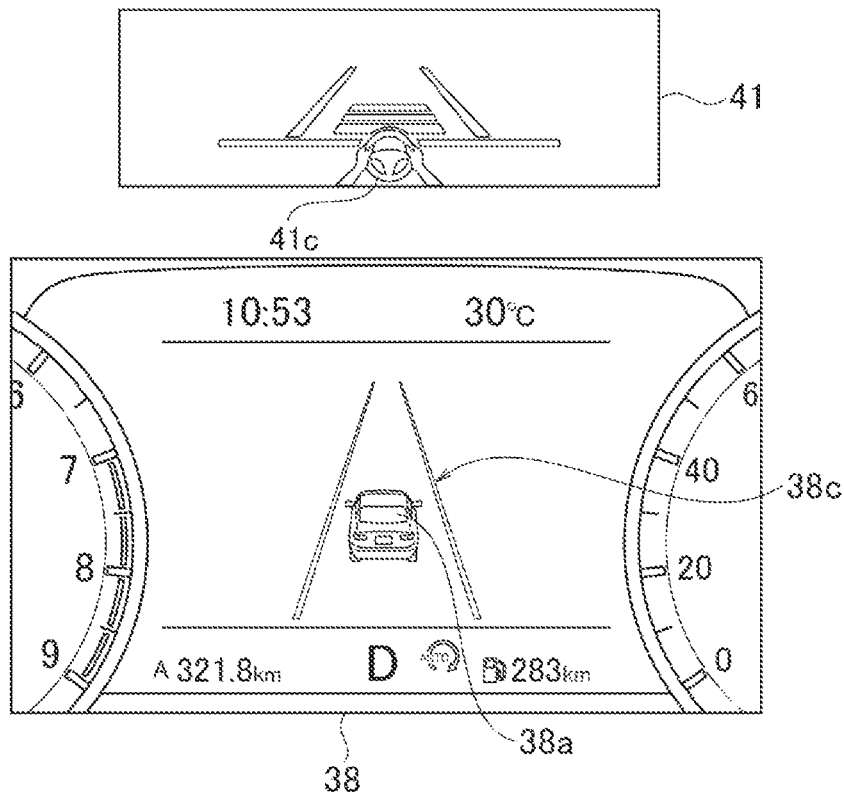
FIG. 8I is an explanatory diagram for showing an example of a first information image and a second information image displayed when the automatic lane change is performed along a route.

During a process from the timing tb7 to before the timing tb8, the first information image 41 and the second information image 38 are mainly composed of the contents indicating the travelling state, and contents for notifying that the host-vehicle will travel to the exit path L4 (FIG. 8G). During a process from the timing tb9 to before the timing tb10, the first information image 41 and the second information image 38 are mainly composed of the contents indicating the travelling state, and contents indicating that the automatic lane change is performed (FIG. 8H). During a process at or after the timing tb10, the first information image 41 and the second information image 38 are mainly composed of the contents indicating the travelling state (FIG. 8I).

As shown in FIGS. 8A to 8I, the first information image 41 includes the preceding vehicle icon 41a, and the first lane marker icon 41d, and shows the travelling state of the vehicle ahead of the host-vehicle 100. Further, the second information image 38 includes the host-vehicle icon 38a, the second lane marker icon 38c, and the surrounding vehicle icon 38d, and shows the travelling state of the vehicle around the host-vehicle 100.

The first information image 41 includes the first character string 41b, and the second information image 38 includes the second character string 38b. An example of the first character string 41b and the second character string 38b will be described below.

In FIG. 8B, the first character string 41b is a character string "(Pictogram) Travel toward an exit". The character string "(Pictogram) Travel toward an exit" indicates contents for proposing the automatic lane change to the driver.

In FIG. 8B, the second character string 38b includes a character string "There will be an exit in a forward left direction", a character string "Confirm the safety", and a character string "(Pictogram) Travel toward an exit". The character string "(Pictogram) Travel toward an exit" indicates contents for proposing the automatic lane change to the driver. The character string "There will be an exit in a forward left direction" indicates the reason why the automatic lane change is proposed. The character string "Confirm the safety" indicates contents for proposing the safety confirmation to the driver. As described above, the second character string 38*b* includes the first character string 41*b* ("(Pictogram) Travel toward an exit"). In other words, the first character string 41*b* is the same as a part of the second character string 38*b*.

On the other hand, in FIG. 8D, the first character string 41*b* is a character string "Change a lane continuously". The character string "Change a lane continuously" indicates contents for notifying that the automatic lane change will be continuously performed.

In FIG. 8D, the second character string 38*b* includes the character string "Change a lane continuously" and a character string "(Pictogram) Make cancellation by long press". The character string "Change a lane continuously" indicates the contents for notifying that the automatic lane change will be continuously performed. The character string "(Pictogram) Make cancellation by long press" indicates contents for notifying how to stop the automatic lane change. Therefore, the second character string 38*b* includes the first character string 41*b*.

However, the display scene in FIG. 8D corresponds to the lane change from the second lane L2 to the first lane L1 (the second automatic lane change) following the lane change from the third lane L3 to the second lane L2 (the first automatic lane change). Therefore, it is considered that the driver has already grasped the reason why the second automatic lane change is performed. Accordingly, in the case of the second automatic lane change, the second character string 38*b* does not include a character string indicating the reason.

Different forms of the first information image 41 and the second information image 38 will be described below.

Figure 9:
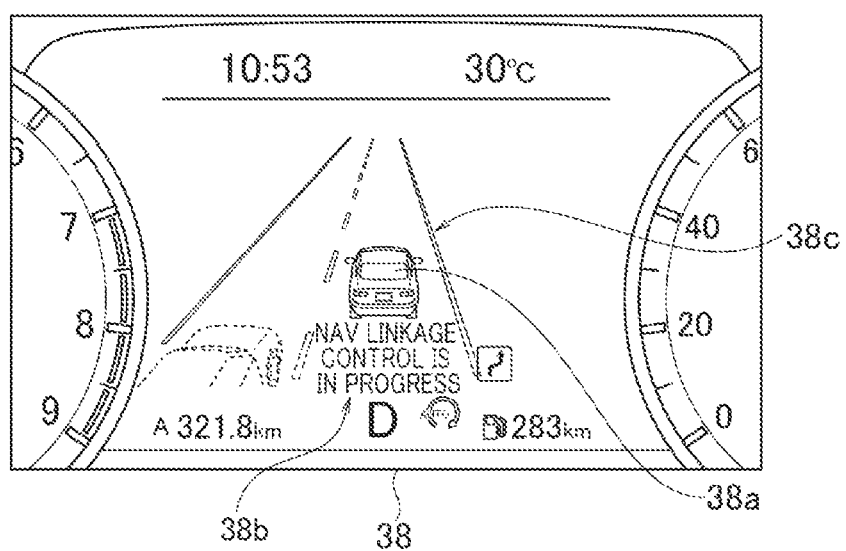
FIG. 9 is an explanatory diagram for showing an example of a second information image.

With reference to FIG. 9, different forms of the second information image 38 will be described. The automatic traveling processing unit 12 performs the linkage control (navigation linkage control) for causing the host-vehicle to travel by linking with the route generated by the route generation unit 11. The automatic traveling processing unit 12 performs the above described automatic lane change in the linkage control. However, when determining a predetermined condition, for example, a traffic congestion, the automatic traveling processing unit 12 prohibits the function of the automatic lane change.

In a case of a time period during which the automatic lane change may not be performed, the second character string 38*b* of the second information image 38 indicates contents of the control state currently performed by the automatic traveling processing unit 12. In FIG. 9, the second character string 38*b* is a character string "Nav linkage control is in progress (pictogram)" which indicates that the navigation linkage control is being performed. The "nav linkage control" is an abbreviation of the navigation linkage control.

In this case, the second character string 38*b* is in a transparent state, and is displayed such that the character string 38*b* is superimposed on other elements included in the second information image 38, such as for example, the lane marker 3*c*.

Next, different forms of the first information image 41 and the second information image 38 will be described. The control system has two modes that are the hands-off mode and the hands-on mode. If a transition condition of the transition to the hands-on mode is established during the hands-off mode, the image generation unit 14 and the display control unit 15 perform the predetermined display for urging the driver to hold the steering.

Figure 10:
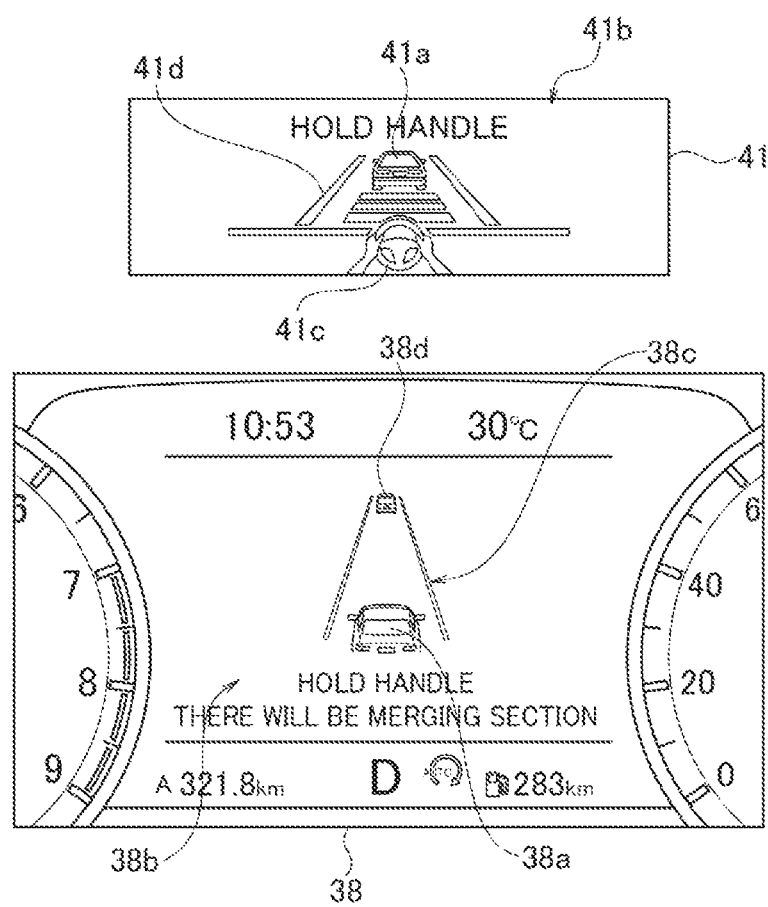
FIG. 10 is an explanatory diagram for showing an example of a first information image and a second information image in the case of the transition from a hands-on mode to a hands-off mode.

Specifically, the image generation unit 14 and the display control unit 15 generate and display the first information image 41 and the second information image 38, such that the first character string 41*b* and the second character string 38*b* are displayed at the same time. For example, as shown in FIG. 10, the first character string 41*b* is a character string "Hold a handle". The second character string 38*b* includes the character string "Hold a handle" and a character string "There will be a merging section".

As described above, in the display control method according to the present embodiment, the first information image (a first image) is displayed on the head-up display 40. The first information image 41 includes the preceding vehicle icon 41*a* and the first character string 41*b* arranged above the preceding vehicle icon 41*a*. Further, in the display control method, the second information image (a second image) 38 is displayed on the meter display 35. The second information image 38 includes the host-vehicle icon 38*a* and the second character string 38*b* which is arranged below the host-vehicle icon 38*a* and includes the first character string 41*b*.

The driver moves a visual line from a forward direction to a lower direction of the host-vehicle to visually recognize the first information image 41 of the head-up display 40. If the driver visually recognizes the second information image 38 of the meter display 35, the driver needs to move the visual line further downward than the head-up display 40. In this way, the head-up display 40 can transmit information to the driver with less visual line movement than the meter display 35. Irrespective of such the difference in visibility characteristics, as described below, the driver can properly grasp pieces of information from the head-up display 40 and the meter display 35.

In the first information image 41 displayed on the head-up display 40, the first character string 41*b* is arranged above the preceding vehicle icon 41*a*. Therefore, the driver visually recognizes the first character string 41*b* before the other element in the first information image 41. This can cause the driver to positively visually recognize the first character string 41*b*. In addition, the first character string 41*b* has a smaller amount of information (the number of characters) than the second character string 38*b* of the second information image 38. Therefore, the driver can easily read the first character string 41*b*.

In the display area of the meter display 35, the second character string 38*b* is arranged below the host-vehicle icon 38*a*. When moving the visual line downward to view the second information image 38, the driver first visually recognizes the host-vehicle icon 38*a*, and then visually recognizes the second character string 38*b*. The driver visually recognizes the first information image 41 of the head-up display 40 in advance. Therefore, the driver already grasps a part (the first character string 41*b*) of the second character string 38*b* displayed on the second information image 38. Accordingly, when the second information image 38 is visually recognized by the driver, information of the host-vehicle icon 38*a* displayed on the second information image 38 can be positively visually recognized by the driver by causing the driver to visually recognize the host-vehicle icon 38*a* before the other element. In addition, the second character string 38*b* can include character strings other than the first character string 41*b*. Accordingly, the driver can receive the first character string 41*b* in a confirmed manner, and also the unique information of the second character string 38*b*.

Further, in the display control method according to the present embodiment, the first character string 41*b* indicates the contents notified to the driver by the control system. The second character string 38*b* includes the first character string 41b, and the third character string indicating the reason why the first character string 41b is notified. The third character string is displayed only on the meter display 35.

The driver can recognize the reason why the first character string 41b is notified by visually recognizing the second character string 38b. Further, the head-up display 40 is requested to display only the minimum necessary information. By displaying the third character string only on the meter display 35, necessary information can be notified to the driver while satisfying the above request for the head-up display 40.

In the display control method according to the present embodiment, the first information image 41 is displayed on the head-up display 40, and the second information image 38 is displayed on the meter display 35, such that the first character string 41b and the second character string 38b are displayed at the same time. In this case, in the display control method, the notification sound is output to the driver in accordance with the display of the first character string 41b and the second character string 38b.

By outputting the notification sound, the consciousness of the driver can be directed to the first character string 41b and the second character string 38b. This can cause the driver to effectively recognize the first character string 41b and the second character string 38b.

When the display of the first character string 41b and the second character string 38b is ended, a reminder to the driver is unnecessary. Therefore, by outputting the notification sound only during the display, the number of times the notification sound is output can be suppressed to reduce the trouble felt by the driver. That is, in the display control method of the present embodiment, when the display of the first character string 41b and the second character string 38b is ended, the notification sound is not output.

In the display control method according to the present embodiment, the preceding vehicle icon 41a indicates the preceding vehicle traveling on the same lane as the host-vehicle. The first information image 41 shows the travelling state of the vehicle ahead of the host-vehicle, when the driver of the host-vehicle looks in the forward direction. On the other hand, the host-vehicle icon 38a indicates the host-vehicle. The second information image 38 shows the travelling state of the vehicle around the host-vehicle when the host-vehicle is viewed from above.

In the second information image 38, the travelling state is displayed on each of the upper side, and right and left sides of the host-vehicle icon 38a. By displaying the second character string 38b below the host-vehicle icon 38a, the travelling state and the second character string 38b can be displayed in a cooperative manner.

Further, the second information image 38 displays the travelling state, when the vehicle is viewed from a position behind the host-vehicle. Therefore, there is a margin below the host-vehicle icon 38a. On the other hand, in the first information image 41, the preceding vehicle is two-dimensionally displayed in the viewpoint of the driver. Therefore, there is a margin above the preceding vehicle icon 41a. The arrangement of character strings is optimized depending on characteristics of each of the information images, and therefore, information can be appropriately notified to the driver.

In the display control method according to the present embodiment, in a case of a time period during which the control system may not perform the automatic lane change, the second character string 38b indicates contents of the control state currently performed by the control system. In this case, the second character string 38b is in a transparent state, and is displayed such that the second character string 38b is superimposed on other elements included in the second information image 38.

Even if the function of the automatic lane change is limited, the driver can recognize the current control state from the second character string 38b. Further, the display that causes the trouble felt to the driver can be suppressed, because the second character string 38b in a transparent state is displayed in a superimposed manner.

Further, in the display control method according to the present embodiment, if the control system proposes the automatic lane change to the driver, the first information image 41 is displayed on the head-up display 40, and the second information image 38 is displayed on the meter display 35 such that the first character string 41b and the second character string 38b are displayed at the same time.

This method can appropriately notify the driver of information on the automatic lane change.

In the display control method according to the present embodiment, contents of the automatic lane change proposed to the driver by the control system include the first automatic lane change, and the second automatic lane change performed following the first automatic lane change. In this case, the second character string 38b displayed in the first automatic lane change includes the first character string 41b, and the third character string indicating the reason why the first character string 41b is notified. On the other hand, the second character string 38b displayed in the second automatic lane change includes the first character string 41b, but does not include the third character string.

In the second automatic lane change, the driver obviously recognizes the reason why the automatic lane change is performed, because the first automatic lane change is already performed. Therefore, by the second character string 38b corresponding to the second automatic lane change not including the third character string, the display causing the trouble felt to the driver can be reduced.

The display control method according to the present embodiment includes a case where the transition condition of the transition to the hands-on mode is established during the hands-off mode. In this case, in the display control method, the first information image 41 and the second information image 38 are displayed, such that the first character string 41b and the second character string 38b are displayed at the same time. The first character string 41b includes contents for urging the driver to hold the steering 1.

This can urge the driver to hold the steering 1 in accordance with the transition from the hands-off mode to the hands-on mode.

The display control device according to the present embodiment includes the controller 10 that controls the head-up display 40, and the meter display 35. The controller 10 displays, on the head-up display 40, the first information image (the first image) 41. The first information image 41 includes the preceding vehicle icon 41a, and the first character string 41b arranged above the preceding vehicle icon 41a. Further, the controller 10 displays, on the meter display 35, the second information image (the second image) 38. The second information image 38 includes the host-vehicle icon 38a, and the second character string 38b that is arranged below the host-vehicle icon 38a, and includes the first character string 41b.

The display control device according to the present embodiment has a technical feature corresponding to the display control method described above, and has the same effect as the display control method.

The present invention is not limited to the present embodiment described above, and various modifications can be made without departing from the scope of the present invention.

For example, in the first image displayed on the head-up display, it is enough if a vehicle icon is a figure representing a vehicle, and the icon is not limited to a figure representing a preceding vehicle. Further, in the second image displayed on the meter display, it is enough if a vehicle icon is a figure representing a vehicle, and the icon is not limited to a figure representing a host-vehicle.

REFERENCE SIGNS LIST

10 Controller
11 Route generation unit
12 Automatic traveling processing unit
13 Vehicle control unit
14 Image generation unit
15 Display control unit
16 Speaker control unit
17 Winker control unit
20 Host-vehicle position estimating device
21 Map acquisition device
22 Surrounding information detection device
23 Vehicle speed sensor
24 Steering switch
25 Touch sensor
26 Winker switch
30 Steering actuator
31 Accelerator pedal actuator
32 Brake actuator
33 Speaker
34 Winker
35 Meter display
40 Head-up display

The invention claimed is:

1. A display control method used for a control system that controls a behavior of a host-vehicle to perform an automatic lane change, the display control method comprising:
when the control system proposes to a driver to perform the automatic lane change, displaying a first image that is a first vehicle icon that is a first vehicle figure and a first character string that proposes the automatic lane change to the driver on a head-up display that displays an image superimposed on a scene ahead of the host-vehicle;
displaying a second image that is a second vehicle icon that is a second vehicle figure and a second character string that includes at least the first character string on a meter display provided to a meter unit that displays a meter of the host-vehicle; and
displaying a third character string indicating a reason why the first character string is notified only on the meter display, wherein:
when contents of the automatic lane change proposed to the driver by the control system include a first lane change and a second lane change following the first lane change,
the second character string displayed in the first lane change includes the first character string and the third character string, and
the second character string displayed in the second lane change includes the first character string, but does not include the third character string.

2. The display control method according to claim 1, further comprising:
displaying the second image on the meter display such that the first character string and the second character string are displayed at a same time; and
notifying with a notification sound to the driver that the first character string and the second character string are displayed.

3. The display control method according to claim 1, wherein
the first vehicle icon indicates a preceding vehicle that travels on a same lane as the host-vehicle;
the first image shows a travelling state of the preceding vehicle ahead of the host-vehicle when the driver of the host-vehicle looks in a forward direction;
the second vehicle icon indicates the host-vehicle; and
the second image shows a travelling state of a vehicle around the host-vehicle when the host-vehicle is viewed from above.

4. The display control method according to claim 1, wherein, in a case of a time period during which the control system may not perform the automatic lane change, the second character string indicates contents of a control state currently performed by the control system.

5. The display control method according to claim 4, wherein the second character string is transparent and is displayed such that the second character string is superimposed on another element included in the second image.

6. The display control method according to claim 1, wherein, when the control system proposes the automatic lane change to the driver, the first character string and the second character string are displayed at a same time.

7. The display control method according to claim 1, wherein;
when a transition condition of a transition to a second mode is established during a first mode, the second mode being a mode in which the driver needs to slightly touch a steering with a hand, and the first mode being a mode in which the driver can release the hand from the steering,
the first character string and the second character string are displayed at a same time; and
the first character string includes contents for urging the driver to hold the steering.

8. The display control method according to claim 1, further comprising:
providing a switch to a steering of the host-vehicle, the switch configured to receive a consent of the driver for the automatic lane change after the automatic lane change is proposed by the control system.

9. The display control method according to claim 1, wherein the first character string is arranged one of above or below the first vehicle icon and the second character string is arranged another of above or below the second vehicle icon.

10. A display control device used for a control system that controls a behavior of a host-vehicle to perform an automatic lane change, the display control device comprising:
a controller that controls a head-up display that displays an image superimposed on a scene ahead of the host-vehicle and a meter display provided to a meter unit that displays a meter of the host-vehicle, wherein the controller is configured to:
when the control system proposes to a driver to perform the automatic lane change, display a first image that is a first vehicle icon including a first vehicle figure and a first character string that proposes the automatic lane change to the driver on the head-up display;

display a second image that is a second vehicle icon including a second vehicle figure and a second character string that includes at least the first character string on the meter display; and display a third character string indicating a reason why the first character string is notified only on the meter display, wherein:

when contents of the automatic lane change proposed to the driver by the control system include a first lane change and a second lane change following the first lane change, the second character string displayed in the first lane change includes the first character string and the third character string; and the second character string displayed in the second lane change includes the first character string, but does not include the third character string.

11. A display control method used for a control system that controls a behavior of a host-vehicle to perform a lane change, the display control method comprising:

displaying a first image on a head-up display that displays an image superimposed on a scene ahead of the host-vehicle, wherein the first image includes a first vehicle icon that is a figure indicating a vehicle and a first character string arranged above the first vehicle icon; and displaying a second image on a meter display provided to a meter unit that displays a meter of the host-vehicle, wherein the second image includes a second vehicle icon that is a figure indicating a vehicle and a second character string that is arranged below the second vehicle icon, and wherein the second character string includes at least the first character string, wherein when the control system proposes a first lane change and a second lane change following the first lane change, the second character string displayed in the first lane change includes the first character string and a third character string, and the second character string displayed in the second lane change includes the first character string without the third character string.

* * * * *